(12) United States Patent
Gomez et al.

(10) Patent No.: US 12,614,384 B2
(45) Date of Patent: Apr. 28, 2026

(54) UNLIT FLARE DETECTION USING SATELLITE IMAGES

(71) Applicant: Schlumberger Technology Corporation, Sugar Land, TX (US)

(72) Inventors: Francisco Jose Gomez, Abingdon (GB); Andrew Pomerantz, Cambridge, MA (US); Athithan Dharmaratnam, Abingdon (GB); Gelmis Radeckis, Leeds (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 371 days.

(21) Appl. No.: 18/548,775

(22) PCT Filed: Mar. 2, 2022

(86) PCT No.: PCT/US2022/018491
§ 371 (c)(1),
(2) Date: Sep. 1, 2023

(87) PCT Pub. No.: WO2022/187341
PCT Pub. Date: Sep. 9, 2022

(65) Prior Publication Data
US 2024/0161495 A1 May 16, 2024

Related U.S. Application Data

(60) Provisional application No. 63/155,424, filed on Mar. 2, 2021.

(51) Int. Cl.
*G06V 20/13* (2022.01)
*G06V 10/764* (2022.01)
(Continued)

(52) U.S. Cl.
CPC ............ *G06V 20/13* (2022.01); *G06V 10/764* (2022.01); *G06V 10/774* (2022.01); *G06V 10/82* (2022.01);
(Continued)

(58) Field of Classification Search
None
See application file for complete search history.

(56) References Cited

U.S. PATENT DOCUMENTS 10,460,170 B1 * 10/2019 Adler ...................... G06N 3/08
2016/0282508 A1 9/2016 Murr et al.
(Continued)

FOREIGN PATENT DOCUMENTS

WO 2017058832 A1 4/2017
WO 2019246280 A1 12/2019

OTHER PUBLICATIONS

Kumar et al ("Potential Underestimation of Satellite Fire Radiative Power Retrievals over Gas Flares and Wildland Fires", Remote Sensing, 2020, 12(2), 9 pages) (Year: 2020).*
(Continued)

*Primary Examiner* — Leon Viet Q Nguyen
(74) *Attorney, Agent, or Firm* — Kyle R. Miiller

(57) ABSTRACT

A method can include receiving data that include satellite data of a region of interest where the region of interest includes multiple hydrocarbon production sites that include gas flaring equipment, identifying one or more unlit gas flares at one or more of the multiple hydrocarbon production sites by using a trained machine learning model and at least a portion of the data and, for an unlit gas flare, issuing an instruction related to operation of the gas flaring equipment in the region of interest.

17 Claims, 17 Drawing Sheets

(51) Int. Cl.

| | |
|---|---|
| *G06V 10/774* | (2022.01) |
| *G06V 10/82* | (2022.01) |
| *G06V 20/52* | (2022.01) |
| *F23G 7/08* | (2006.01) |
| *G06V 10/30* | (2022.01) |

(52) U.S. Cl.
CPC .............. *G06V 20/52* (2022.01); *F23G 7/08* (2013.01); *G06V 10/30* (2022.01)

(56) References Cited

U.S. PATENT DOCUMENTS

| | | |
|---|---|---|
| 2018/0266680 A1 | 9/2018 | Arabi et al. |
| 2019/0242575 A1 | 8/2019 | Fisher et al. |
| 2019/0303648 A1* | 10/2019 | Zhai ..................... G06V 10/764 |
| 2021/0247369 A1* | 8/2021 | Nottrott ............. G01N 33/0047 |

OTHER PUBLICATIONS

Cusworth et al ("Multisatellite imaging of a gas well blowout enables quantification of total methane emissions." Geophysical Research Letters 48.2 (2021): e2020GL090864) (Year: 2021).*

"Burned area trends in Brazil similar to previous years", The European Space Agency, Mar. 6, 2023, ESA applications, Observing the Earth, downloaded on Dec. 12, 2023 from [http://www.esa.int/Applications/Observing_the_Earth/Burned_area_trends_in_Brazil_similar_to_previous_years], 4 pages.

"Natural Gas Flaring and Venting: State and Federal Regulatory Overview, Trends, and Impacts", Department of Energy Report, Jun. 2019, 72 pages.

Chapa, S., "Enviros: Winter storm resulted in massive amounts of flaring in Permian Basin", in the Houston Chronicle (Feb. 10, 2020, Updated: Feb. 10, 2020 7:44 p.m., downloaded on Dec. 12, 2023 from [https://www.chron.com/business/energy/article/Enviros-Winter-storm-resulted-in-massive-amounts-15039446.php], 4 pages.

Chukwubuikem, O. et al., "Satellite survey of gas flares: development and application of a Landsat-based technique in the Niger Delta", International Journal of Remote Sensing, 2014, 35(5), pp. 1900-1925, DOI: 10.1080/01431161.2013.879351.

Cusworth, D. H. et al., "Multisatellite Imaging of a Gas Well Blowout Enables Quantification of Total Methane Emissions", Geophysical Research Letters, 2021, 48 (2), 9 pages.

De Gouw, J. A., et al., "Daily Satellite Observations of Methane from Oil and Gas Production Regions in the United States", Scientific Reports, 10, 1379 (2020). https://doi.org/10.1038/s41598-020-57678-4, 10 pages.

Dozier, J., "A Method for Satellite Identification of Surface Temperature Fields of Subpixel Resolution", Remote Sensing of Environment, 1981, 11, pp. 221-229.

Elvidge, C. D., "VIIRS Nightfire: Satellite Pyrometry at Night", Remote Sensing. 2013, 5, pp. 4423-4449.

Elvidge, C. D., et al., "Methods for Global Survey of Natural Gas Flaring from Visible Infrared Imaging Radiometer Suite Data", Energies, 2016, 9(1), 15 pages.

Faruolo, M. et al., "A satellite-based analysis of the Val dAgri Oil Center (southern Italy) gas flaring emissions", National Hazards and Earth System Science, 2014, 14, pp. 2783-2793.

Faruolo, M. et al., "On the Potential of the RST-FLARE Algorithm for Gas Flaring Characterization from Space", Sensors, 2018, 18(8), 21 pages.

Ichoku, C. et al., "Comparative analysis of daytime fire detection algorithms using AVHRR data for the 1995 fire season in Canada: perspective for MODIS", International Journal of Remote Sensing, 2003, 24(8), pp. 1669-1690.

Kant, Y. et al., "Sub-pixel fire detection using Landsat-TM thermal data", Infrared Physics Technology, 2002, 43, pp. 383-387.

Kaufman, Y. J. et al., "Monitoring Global Fires from EOS-MODIS", Journal of Geophysical Research, 1998, 103 (D24), pp. 32215-32338.

Kumar, S. S. et al., "Potential Underestimation of Satellite Fire Radiative Power Retrievals over Gas Flares and Wildland Fires", Remote Sensing, 2020, 12(2), 9 pages.

Lagios, E. et al., "Testing satellite and ground thermal imaging of low-temperature fumarolic fields: the dormant Nisyros Volcano (Greece)", ISPRS Journal of Photogrammetry & Remote Sensing, 2007, 62, pp. 447-460.

Li, Z. et al., 2000. "A Review of AVHRR-Based Active Fire Detection Algorithms: Principles, Limitations, and Recommendations", Global and Regional Vegetation Fire Monitoring from Space: Planning a Coordinated International Effort, 2001, pp. 199-225.

Manyangadze, Tawanda, "Multi-temporal threshold algorithm in forest fire detection using MSG satellite: the case of Zimbabwe", 2013, ATPS (African Technology Policy Studies Network). ATPS Working Paper No. 76. Nairobi: ATPS, 26 pages.

Martin, M. P., "Fire Detection and Fire Growth Monitoring Using Satellite Data," downloaded on Dec. 12, 2023 from https://www.researchgate.net/profile/Stephane-Flasse/publication/267972470_6_Fire_detection_and_fire_growth_monitoring_using_satellite_data/links/55914a5508ae1e1f9baf969a/6-Fire-detection-and-fire-growth-monitoring-using-satellite-data.pdf , 1999, 22 pages.

Muirhead, K. et al., "Identification of gas flares in the North Sea using satellite data", International Journal of Remote Sensing, 1984, 5(1), pp. 199-212.

Peterson, D. et al., "A sub-pixel-based calculation of fire radiative power from MODIS observations: Algorithm development and initial assessment", Remote Sensing of Environment, 2013, 129: pp. 262-279.

Prins, E. M. et al., "Geostationary satellite detection of biomass burning in South America", International Journal of Remote Sensing, 1992, 13 (15), pp. 2783-2799.

Robinson, J. M., "Fire from space: Global fire evaluation using infrared remote sensing", International Journal of Remote Sensing, 1991, 12, pp. 3-24.

Ronneberger, O. et al., "U-Net: Convolutional Networks for Biomedical Image Segmentation," arXiv:1505.04597 (2015), 8 pages.

Schmidt, C.C. et al., "The GOES Wildfire Automated Biomass Burning Algorithm and Its Applications", 2005, East Fire Conference, Fairfax, VA, May 11-13, 2005, 4 pages.

Sharma, A., "Evaluation of VIIRS Nightfire Product and Comparison with MODIS and VIIRS Active Fire Products in a Russian Gas Flaring Region", Master of Science dissertation, Department of Earth and Atmospheric Sciences, University of Nebraska-Lincoln, 2019, 86 pages.

Sheng, H. et al., "OGNet: Towards a Global Oil and Gas Infrastructure Database using Deep Learning on Remotely Sensed Imagery", arXiv pre-print arXiv:2011.07227, 2020, 8 pages.

Wooster, M. J. et al., "Sentinel-3 SLSTR active fire detection and FRP product: Pre-Launch algorithm development and performance evaluation using MODIS and ASTER datasets", Remote Sensing of Environment, 2012, 120, pp. 236-254.

Zhang, Y. et al., "Quantifying methane emissions from the largest oil-producing basin in the United States from space", Science Advances, 2020, 6(17), EAAZ5120, 9 pages.

Zukhov, B. et al., "Spaceborne Detection and Characterization of Fires During the Bi-Spectral Infrared Detection (BIRD) Experimental Small Satellite Mission (2001-2004)", Remote Sensing of Environment, 2006, 100, pp. 29-51.

Search Report and Written Opinion of International Patent Application No. PCT/US2022/018491 dated May 19, 2022, 11 pages.

* cited by examiner

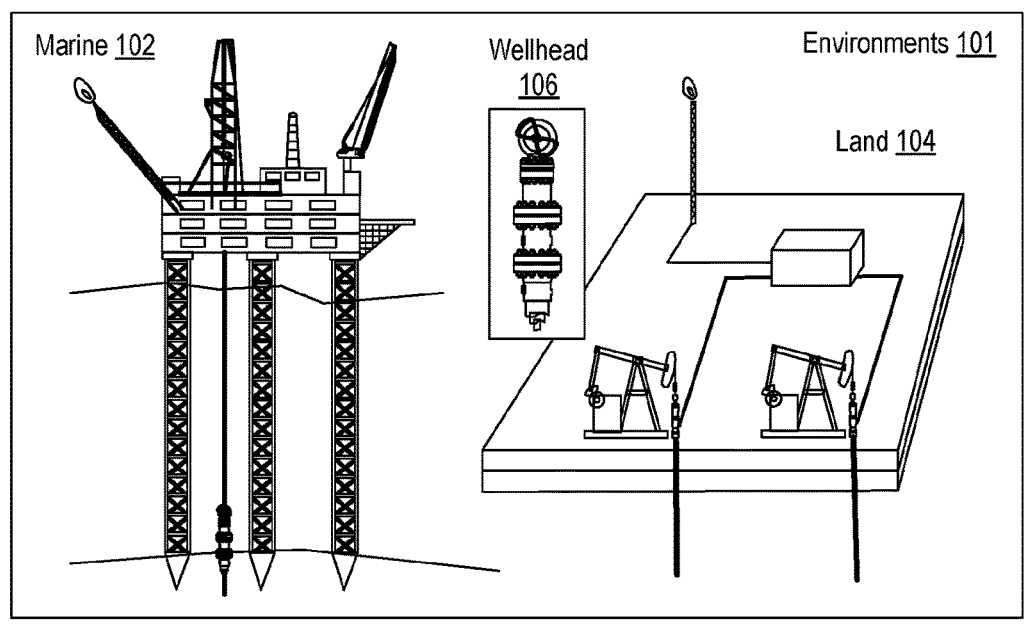
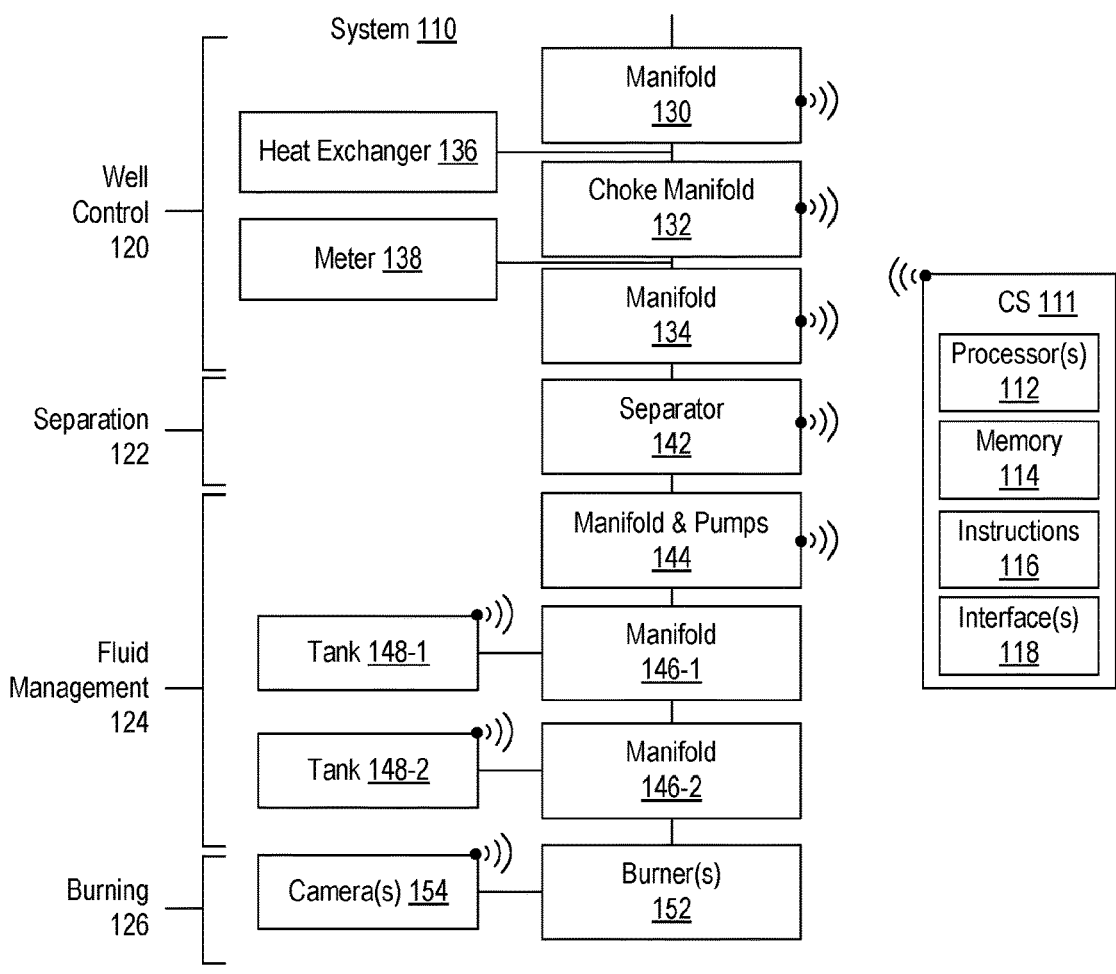
Fig. 1

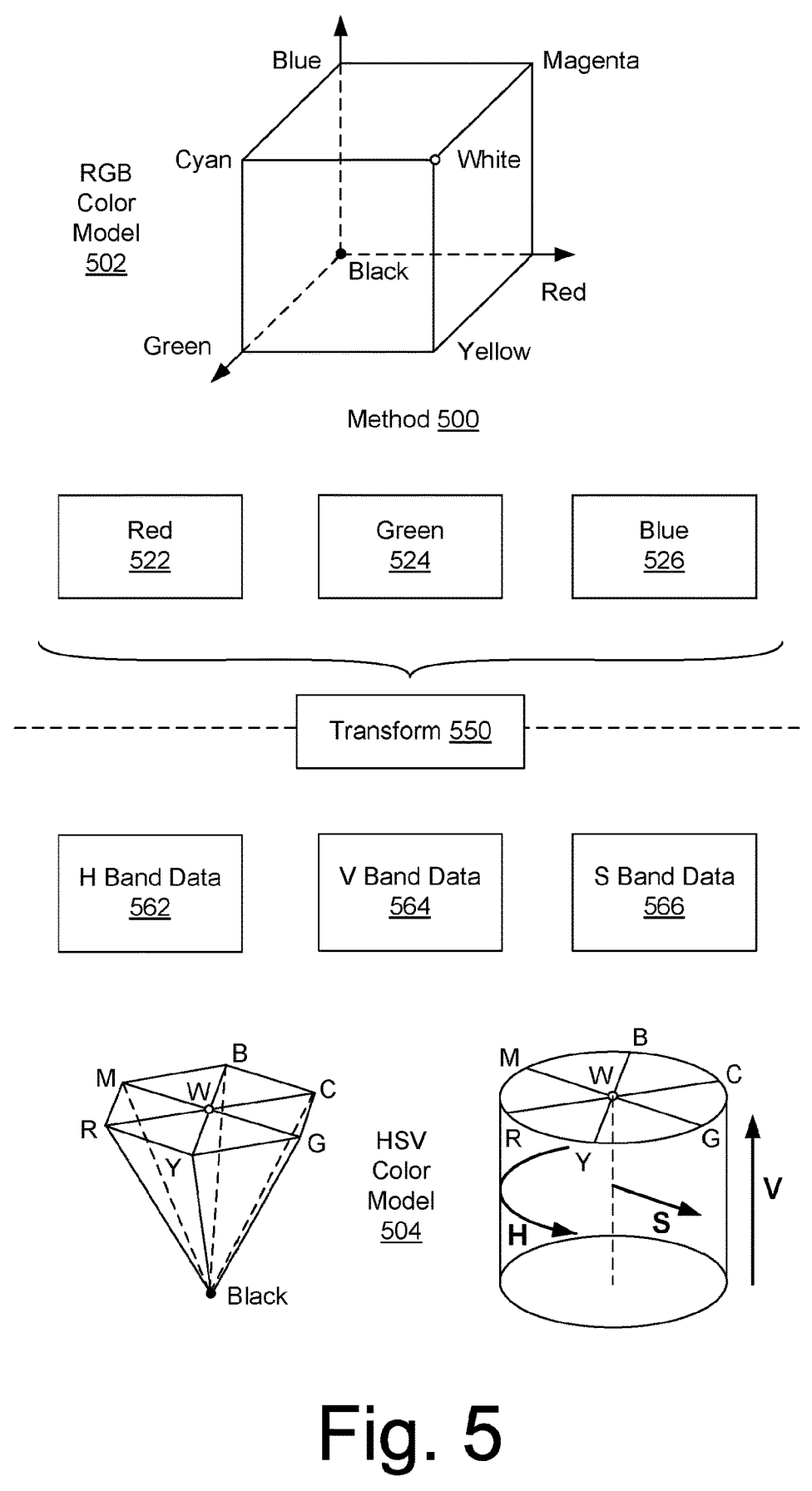

RGB
Color
Model
502

Blue

Magenta

Cyan

White

Black

Red

Green

Yellow

Method 500

| Red 522 | Green 524 | Blue 526 |

Transform 550

| H Band Data 562 | V Band Data 564 | S Band Data 566 |

HSV
Color
Model
504

Black

Fig. 5

System 700

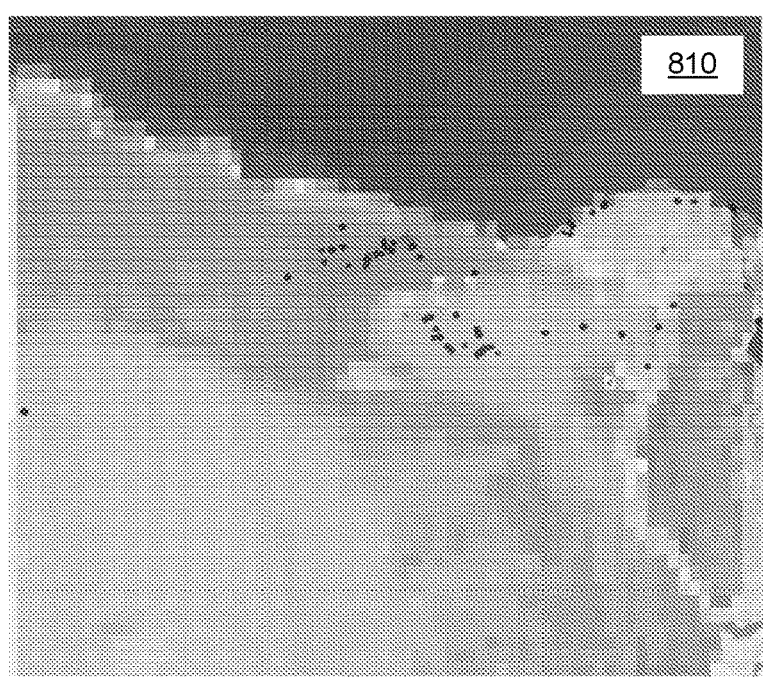
VIIRS – Algeria Calibration Point
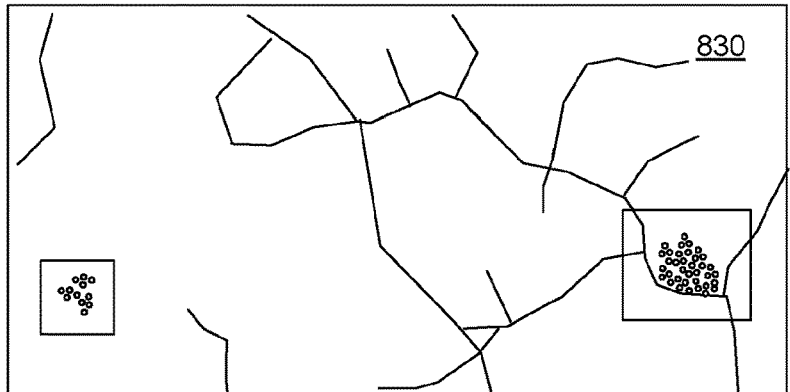
VIIRS and Sentinel 5P Correlation
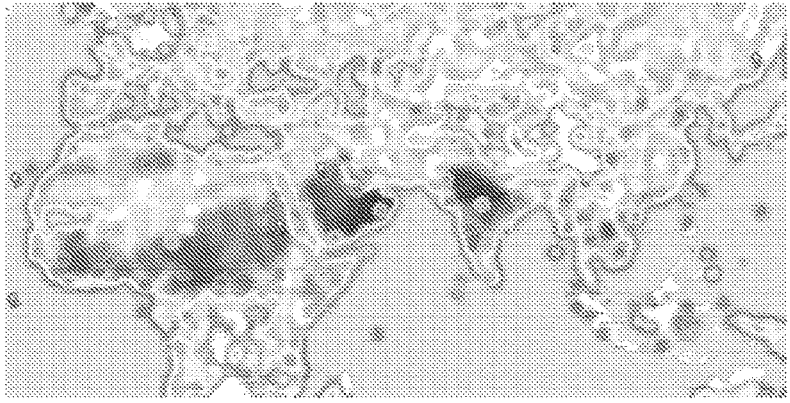
Fig. 8

1100

ML Model 1200

Framework 1300

| Training Libraries | Inference Libraries |
|---|---|

| PYTHON Language Client | C++ Language Client | Other Client |
|---|---|---|

C API (e.g., and/or other API(s))

Distributed Master        Dataflow Executor

| Const | Var | MatMul | Conv2D | ReLU | Queue | Other(s) |
|---|---|---|---|---|---|---|

Kernel Implementations

| RPC | RDMA | Other(s) |
|---|---|---|

Networking Layer

| CPU | GPU | Other(s) |
|---|---|---|

Device Layer

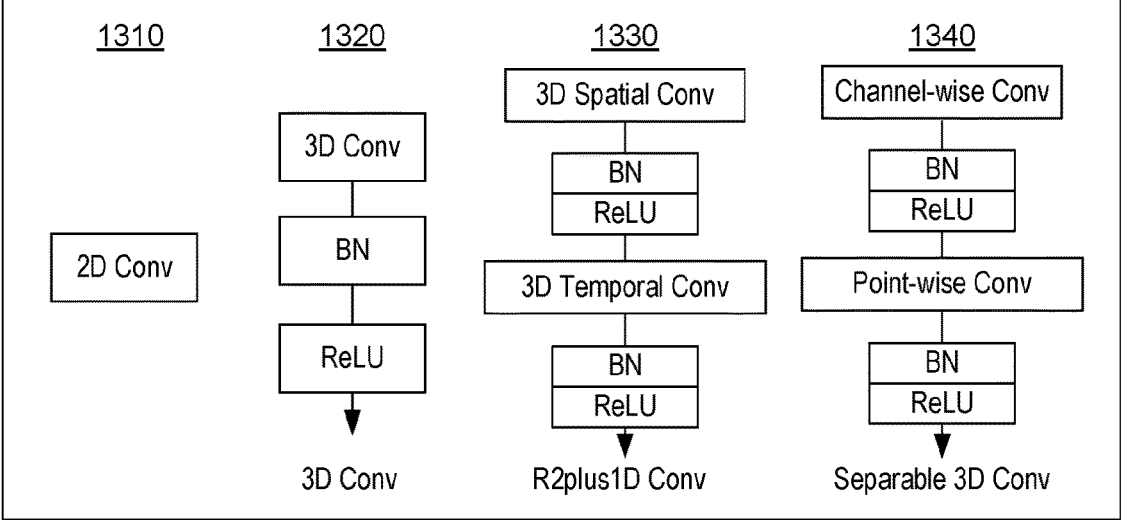

1310        1320        1330        1340

2D Conv

3D Conv
BN
ReLU
3D Conv

3D Spatial Conv
BN
ReLU
3D Temporal Conv
BN
ReLU
R2plus1D Conv

Channel-wise Conv
BN
ReLU
Point-wise Conv
BN
ReLU
Separable 3D Conv

Method <u>1500</u>

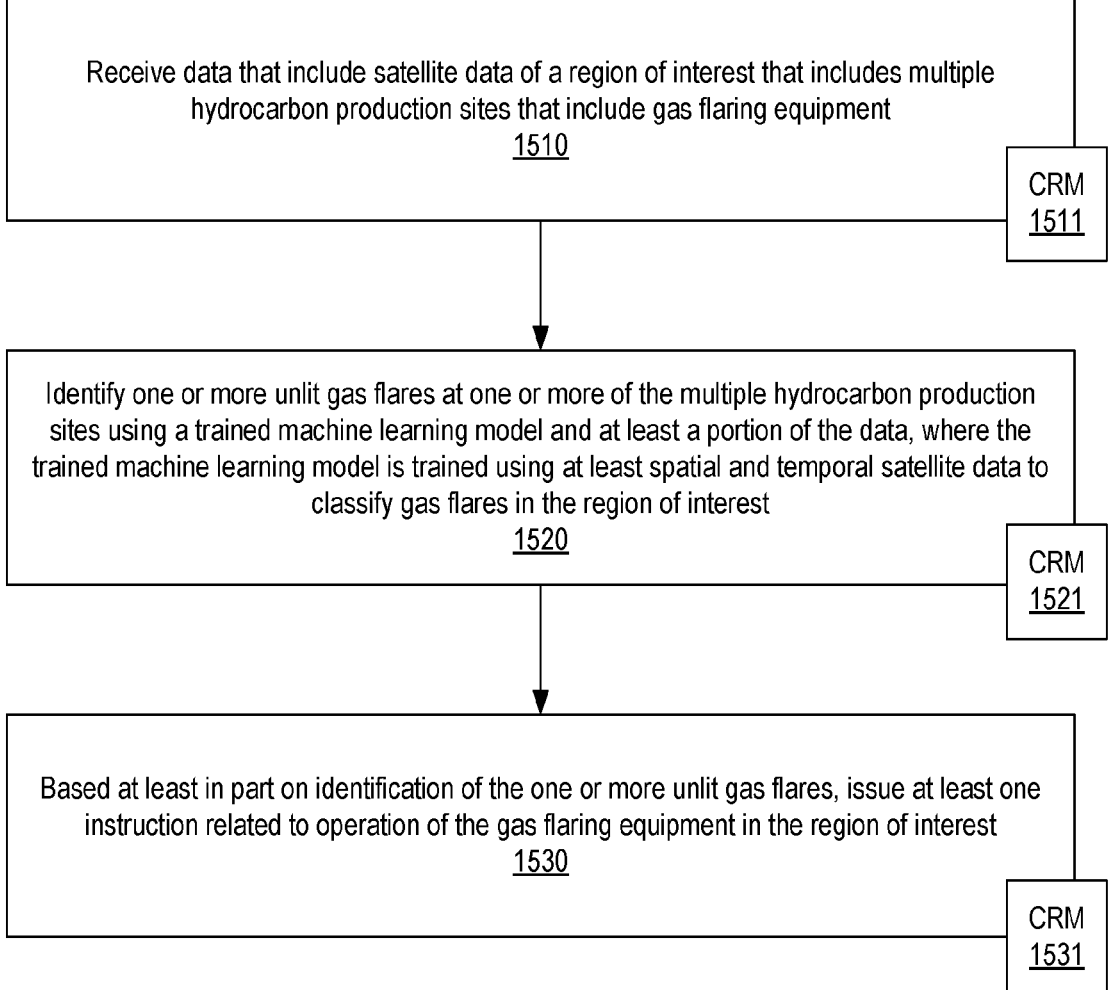

Receive data that include satellite data of a region of interest that includes multiple hydrocarbon production sites that include gas flaring equipment
<u>1510</u>

CRM
<u>1511</u>

Identify one or more unlit gas flares at one or more of the multiple hydrocarbon production sites using a trained machine learning model and at least a portion of the data, where the trained machine learning model is trained using at least spatial and temporal satellite data to classify gas flares in the region of interest
<u>1520</u>

CRM
<u>1521</u>

Based at least in part on identification of the one or more unlit gas flares, issue at least one instruction related to operation of the gas flaring equipment in the region of interest
<u>1530</u>

CRM
<u>1531</u>

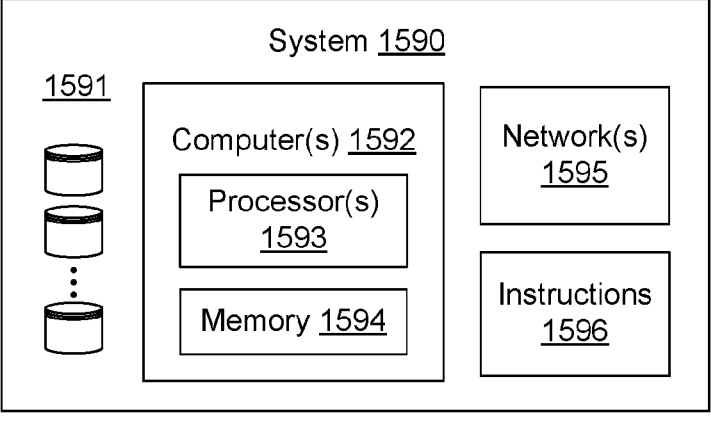

System <u>1590</u>

<u>1591</u>

Computer(s) <u>1592</u>

Processor(s)
<u>1593</u>

Memory <u>1594</u>

Network(s)
<u>1595</u>

Instructions
<u>1596</u>

Fig. 15

Method <u>1600</u>

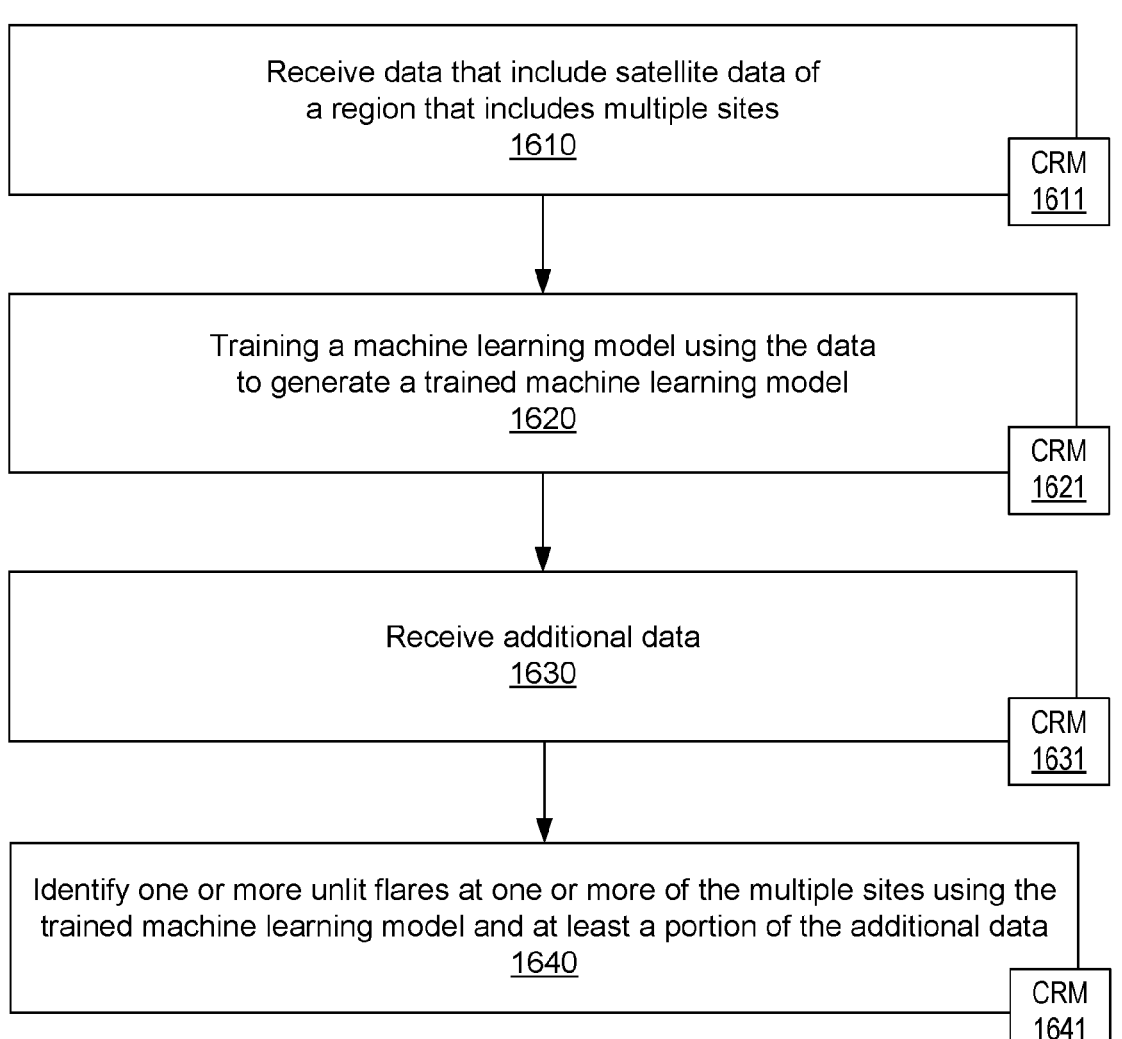

Receive data that include satellite data of
a region that includes multiple sites
<u>1610</u>

CRM
<u>1611</u>

Training a machine learning model using the data
to generate a trained machine learning model
<u>1620</u>

CRM
<u>1621</u>

Receive additional data
<u>1630</u>

CRM
<u>1631</u>

Identify one or more unlit flares at one or more of the multiple sites using the
trained machine learning model and at least a portion of the additional data
<u>1640</u>

CRM
<u>1641</u>

Fig. 16

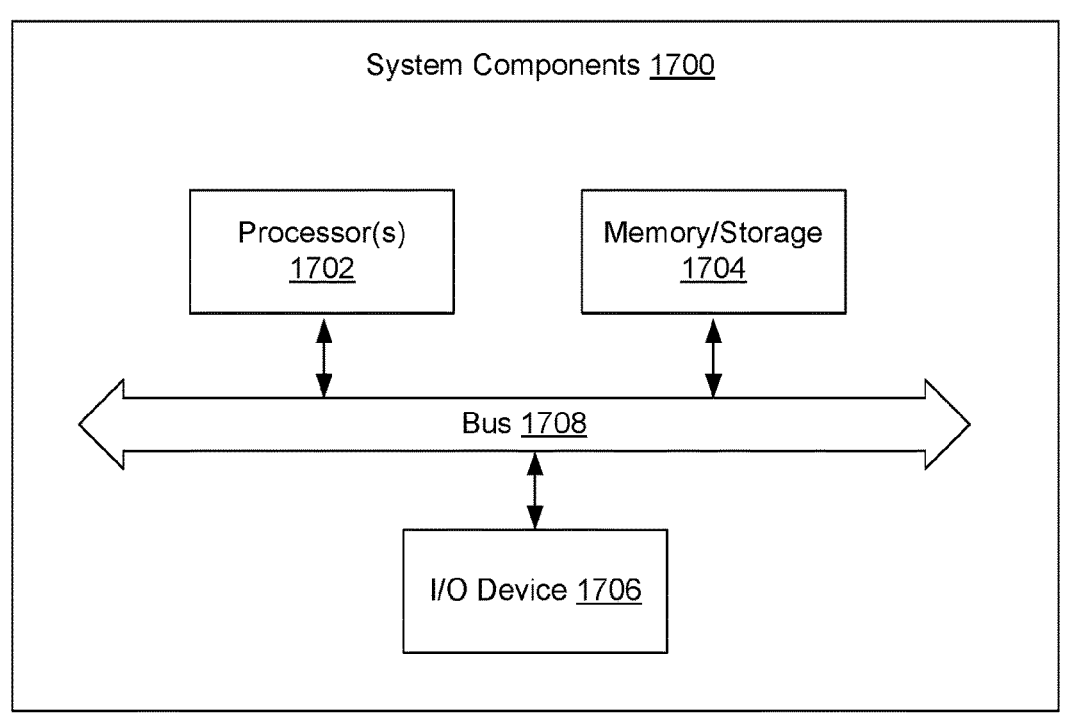
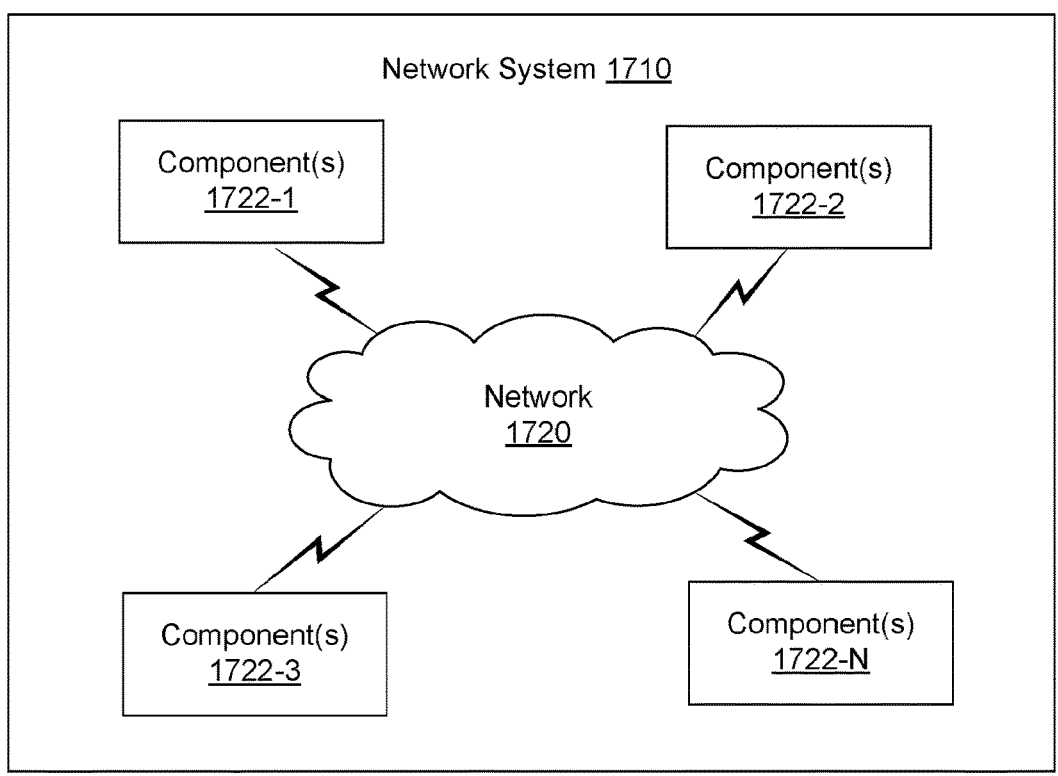
Fig. 17

UNLIT FLARE DETECTION USING SATELLITE IMAGES

RELATED APPLICATION

This application is a National Stage Entry of International Application No. PCT/US2022/018491, filed Mar. 2, 2022, which claims priority to and the benefit of a U.S. Provisional application having Ser. No. 63/155,424, filed Mar. 2, 2021, which is incorporated herein by reference in its entirety.

BACKGROUND

The global oil and gas industry is trending toward improved environmental safety and compliance throughout the various phases of a well lifecycle. Exploration and production involves dynamic well testing that can produce a large amount of hydrocarbons at the surface. As, at times, excess hydrocarbons cannot be stored, they may be disposed of by flaring, which can be relevant for onshore operations and offshore operations. Flaring can occur during various phases or operations, which can include drilling, well testing, production, etc.

Combustion of hydrocarbon can result in various types of emissions, which can include, for example, visible emission, heat energy emission, and smoke. Burner operations (e.g., flaring) can be controlled on site, for example, via air supply adjustment, which may aim to maintain acceptable combustion through variations in fluid properties, flowrates, and weather conditions.

For the continuous burning phase which can last for days, on site monitoring and regulation of air supply to the burner can be controllable if appropriate control equipment to regulate gas flow and combustion exists on site. A failing to monitor combustion and adjust air supply according to the flame or smoke appearance can have a negative impact on the combustion quality and emissions from the burner. For example, consider short chain hydrocarbons such as methane, propane, ethylene, propylene, butadiene and butane, which under ideal conditions can react efficiently with atmospheric oxygen to form carbon dioxide ($CO_2$) and water. Inefficient combustion (i.e., poor quality combustion) can result in higher emissions of such hydrocarbons along with chemical intermediates. Inefficient combustion can result in environmental and regulatory issues. Flare monitoring can increase awareness of inefficient combustion of lit flares and may provide indications of direct emissions from unlit flares.

SUMMARY

A method can include receiving data that include satellite data of a region of interest that includes multiple hydrocarbon production sites that include gas flaring equipment; identifying one or more unlit gas flares at one or more of the multiple hydrocarbon production sites using a trained machine learning model and at least a portion of the data, where the trained machine learning model is trained using at least spatial and temporal satellite data to classify gas flares in the region of interest; and, based at least in part on the identifying, issuing at least one instruction related to operation of the gas flaring equipment in the region of interest.

A system can include a processor; a memory accessible by the processor; and processor-executable instructions stored in the memory that are executable to instruct the system to: receive data that include satellite data of a region that includes multiple sites; train a machine learning model using the data to generate a trained machine learning model; receive additional data; and identify one or more unlit flares at one or more of the multiple sites using the trained machine learning model and at least a portion of the additional data.

One or more computer-readable storage media can include computer-executable instructions executable to instruct a computer to: receive data that include satellite data of a region that includes multiple sites; train a machine learning model using the data to generate a trained machine learning model; receive additional data; and identify one or more unlit flares at one or more of the multiple sites using the trained machine learning model and at least a portion of the additional data.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 is a series of diagrams of example environments and an example of a burner system.

FIG. 5 is a diagram of an example of a method.

FIG. 8 is a series of example images and an example graphical user interface.

FIG. 13 is a diagram of an example of a computational framework.

FIG. 15 is a diagram of an example of a method and an example of a system.

FIG. 16 is a diagram of an example of a method.

FIG. 17 illustrates example components of a system and a networked system.

DETAILED DESCRIPTION

Figure 2:
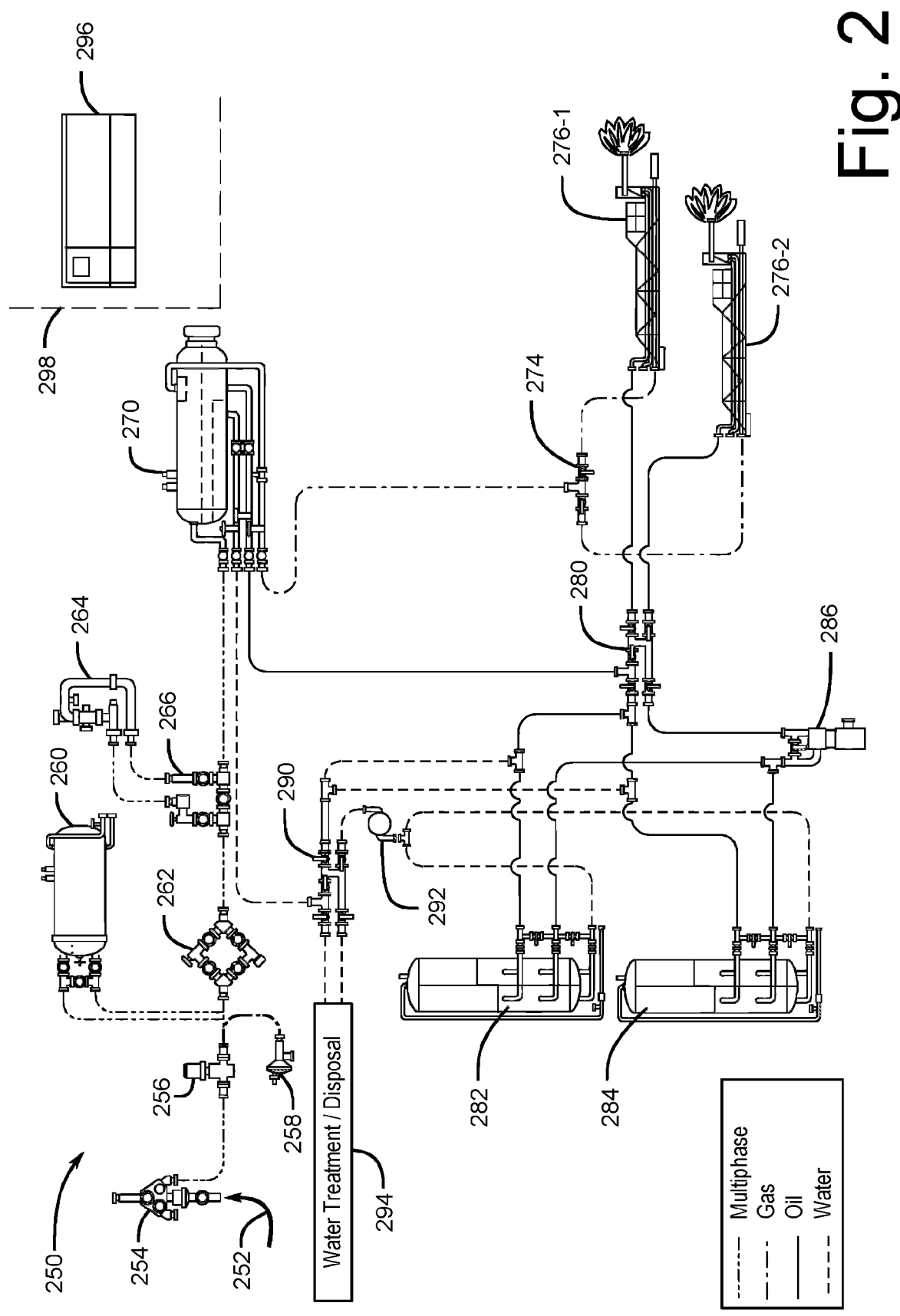
FIG. 2 is a diagram of an example of a burner system.

The following description is not to be taken in a limiting sense, but rather is made merely for the purpose of describing the general principles of the implementations. The scope of the described implementations should be ascertained with reference to the issued claims.

Methane ($CH_4$) is a hydrocarbon that can be classified as an anthropogenic greenhouse gas (GHG) in the atmosphere (e.g., consider carbon dioxide as another type of greenhouse gas). The International Energy Agency (IEA) Methane Tracker 2020 report states that emissions from the oil and gas industry account for approximately 22 percent of anthropogenic sources (see EA Methane Tracker, Fuel report—March 2020 https://www.iea.org/reports/methane-tracker-2020).

When natural gas is burned in a flare, $CO_2$ and water are generated as products of the combustion process. Considering that methane is estimated to be 80 times more potent than $CO_2$ in a 20-year lifespan, knowing the status of a flare (e.g., a burner) can be helpful. For example, knowing when flares are unlit and venting uncombusted methane to the atmosphere can be helpful to know for various reasons. As explained, efficient combustion by a lit flare aims to convert hydrocarbons to $CO_2$ and water, which can be considered relatively innocuous compared to direct release of such hydrocarbons into the atmosphere. If an emissions strategy involves combustion, detection of a lit flare can be an indicator that the emissions strategy is being implemented; whereas, detection of an unlit flare (e.g., via a change in status of a previously lit flare) can indicate that the emissions strategy is experiencing issues.

Satellite data can provide a coarse indicator of potential methane leaks through direct atmospheric methane concentration readings. A couple of public satellites circle the earth every 24 hours and can monitor methane emissions and detect fires. Various satellites can circle the Earth multiple times per day (e.g., consider 2 to 14 times or more). Various satellites have relatively large apertures such that they can observe the entire surface of the Earth (e.g., every day, etc.). As to resolution, some have resolutions that range from approximately 750 m×750 m (0.56 km$^2$) to 7 km×7 km (49 km$^2$). Some satellites have finer resolutions, for example, consider the Sentinel 2P satellite with a resolution of approximately 20 m×20 m (e.g., 400 m$^2$).

A cost-effective system can monitor flares in a relatively continuous manner to identify when flares have gone out (e.g., become unlit) and, for example, detect unusual atmospheric methane concentrations and alert when issues are found so appropriate actions can be triggered. As an example, an automatic system can detect unlit flares using geospatial data from multiple sources and issue one or more types of signals, for example, when an issue or issues are detected. As explained, such an issue or issues can pertain to an emissions strategy for one or more sites. The issuance of one or more types of signals can provide notifications to take corrective action or control instructions to control equipment to take corrective action.

FIG. 1 shows examples of environments 101, including a marine environment 102 and a land environment 104 where the marine environment 102 includes various equipment and where the land environment 104 includes various equipment. As shown, each of the environments 101 can include one or more wellheads 106 (e.g., wellhead equipment). A wellhead can be a surface termination of a wellbore that can include a system of spools, valves and assorted adapters that, for example, can provide for pressure control of a production well. A wellhead may be at a land surface, a subsea surface (e.g., an ocean bottom, etc.), etc. As an example, conduits from multiple wellheads may be joined at one or more manifolds such that fluid from multiple wells can flow in a common conduit.

At various times, a well may be tested using a process referred to as well testing. During well testing, reservoir fluids can be produced at a separator at varying rates, for example, according to a predetermined schedule. Such tests may take less than two days to evaluate a single well or may take months to evaluate reservoir extent. As such, flaring, which may depend on test type, etc., may occur over a period of a day or less or more than a month. Well testing can include one or more of a variety of well testing operations where tests may include, for example, one or more of buildup, drawdown, falloff, injection and interference. In various instances, fluid can flow from a well or wells to surface where the fluid is subjected to one or more well testing operations and generates scrap (e.g., waste fluid), which must be handled appropriately, for example, according to circumstances, regulations, etc. For example, consider loading waste fluid into a tanker for transport to a facility that can dispose of the waste fluid. Another manner of handling waste fluid can be through combustion, which can be referred to as burning. As an example, burning can be part of a well testing process, whether burning is for handling waste fluid and/or for analyzing one or more aspects of how one or more waste fluids burn. As to the latter, burning may optionally provide data as to one or more characteristics of well fluid (e.g., a component thereof, etc.).

As an example, disposal of produced hydrocarbons during one or more types of operations may be via burning, which can include on-site burning and/or offsite burning. Burning can be particularly suitable when facilities are not available for storage (e.g., consider mobile offshore drilling rigs, remote locations onshore, etc.).

As to the example environments 101 of FIG. 1, consider well testing as an operation that may be performed, for example, using equipment shown in the marine environment 102 and/or using equipment shown in the land environment 104. As an example, an environment may be under exploration, development, appraisal, etc., where such an environment includes at least one well where well fluid can be produced (e.g., via natural pressure, via fracturing, via artificial lift, via pumping, via flooding, etc.). In such an environment, various types of equipment may be on-site, which may be operatively coupled to well testing equipment.

FIG. 1 shows an example of a system 110 that can be operatively coupled to one or more conduits that can transport well fluid, for example, from one or more wellheads. As shown, the system 110 can include a computational system 111 (CS), which can include one or more processors 112, a memory 114 accessible to at least one of the one or more processors 112, instructions 116 that can be stored in the memory 114 and executable by at least one of the one or more processors 112, and one or more interfaces 118 (e.g., wired, wireless, etc.). In the example of FIG. 1, the system 110 is shown as including various communication symbols, which may be for transmission and/or reception of information (e.g., data, commands, etc.), for example, to and/or from the computational system 111. As an example, the computational system 111 can be a controller that can issue control instructions to one or more pieces of equipment in an environment such as, for example, the marine environment 102 and/or the land environment 104. As an example, the computational system 111 may be local, may be remote or may be distributed such that it is in part local and in part remote.

Referring again to the wellhead 106, it can include various types of wellhead equipment such as, for example, casing and tubing heads, a production tree, a blowout preventer, etc. Fluid produced from a well can be routed through the wellhead 106 and into the system 110, which can be configured with various features for well testing operations.

In the example of FIG. 1, the system 110 is shown to include various segments, which may be categorized operationally. For example, consider a well control segment 120, a separation segment 122, a fluid management segment 124, and a burning segment 126.

As shown in the example of FIG. 1, the well control segment 120 is an assembly of various components such as a manifold 130, a choke manifold 132, a manifold 134, a heat exchanger 136 and a meter 138; the separation segment 122 includes a separator 142; the fluid management segment 124 is an assembly of various components such as manifolds and pumps 144, a manifold 146-1, a manifold 146-2, a tank 148-1 and a tank 148-2; and the burning segment 126 includes a burner 152 and one or more cameras 154.

As mentioned, in the example of FIG. 1, the system 110 includes various features for one or more aspects of well testing operations; noting that the system 110 may include lesser features, more features, alternative features, etc. For example, consider one or more of a gas specific gravity meter, a water-cut meter, a gas-to-oil ratio sensor, a carbon dioxide sensor, a hydrogen sulfide sensor, or a shrinkage measurement device. Various features may be upstream and/or downstream of a separator segment or a separator.

With respect to flow of fluid from a well or wells, such fluid may be received by the well control segment 120 and then routed via one or more conduits to the separation segment 122. In the example of FIG. 1, the well control segment 120 including the heat exchanger 136 may be provided as a steam-heat exchanger and the meter 138 for measuring flow of fluid through the well control segment 120.

As mentioned, the well control segment 120 can convey fluid received from one or more wells to the separator 142. As an example, the separator 142 can be a horizontal separator or a vertical separator, and can be a two-phase separator (e.g., for separating gas and liquids) or a three-phase separator (e.g., for separating gas, oil, and water). A separator may include various features for facilitating separation of components of incoming fluid (e.g., diffusers, mist extractors, vanes, baffles, precipitators, etc.).

As an example, fluid can be single phase or multiphase fluid where "phase" refers to an immiscible component (e.g., consider two or more of oil, water, and gas).

As an example, the separator 142 can be used to substantially separate multiphase fluid into its oil, gas, and water phases, as appropriate and as present, where each phase emerging from the separator 142 may be referred to as a separated fluid. Such separated fluids may be routed away from the separator 142 to the fluid management segment 124. In various instances, the separated fluids may not be entirely homogeneous. For example, separated gas exiting the separator 142 can include some residual amount of water or oil and separated water exiting the separator 142 can include some amount of oil or entrained gas. Similarly, separated oil leaving the separator 142 can include some amount of water or entrained gas.

As shown in the example of FIG. 1, the fluid management segment 124 includes flow control equipment, such as various manifolds and pumps (generally represented by the block 144) for receiving fluids from the separator 142 and conveying the fluids to other destinations, as well as additional manifolds 146-1 and 146-2 for routing fluid to and from fluid tanks 148-1 and 148-2. While two manifolds 146-1 and 146-2 and two tanks 148-1 and 148-2 are depicted in FIG. 1, it is noted that the number of manifolds and tanks can be varied. For instance, in one embodiment, the fluid management segment 124 can include a single manifold and a single tank, while in other embodiments, the fluid management segment 124 can include more than two manifolds and more than two tanks.

As to the manifolds and pumps 144, they can include a variety of manifolds and pumps, such as a gas manifold, an oil manifold, an oil transfer pump, a water manifold, and a water transfer pump. In at least some embodiments, the manifolds and pumps 144 can be used to route fluids received from the separator 142 to one or more of the fluid tanks 148-1 and 148-2 via one or more of the additional manifolds 146-1 and 146-2, and to route fluids between the tanks 148-1 and 148-2. As an example, the manifolds and pumps 144 can include features for routing fluids received from the separator 142 directly to the one or more burners 152 for burning gas and oil (e.g., bypassing the tanks 148-1 and 148-2) or for routing fluids from one or more of the tanks 148-1 and 148-2 to the one or more burners 152.

As noted above, components of the system 110 may vary between different applications (e.g., operations, etc.). As an example, equipment within each functional group of the system 110 may also vary. For example, the heat exchanger 136 could be provided as part of the separation segment 122, rather than of the well control segment 120.

In certain embodiments, the system 110 can be a surface well testing system that can be monitored and controlled remotely. Remote monitoring may be effectuated with sensors installed on various components. In some instances, a monitoring system (e.g., sensors, communication systems, and human-machine interfaces) can enable monitoring of one or more of the segments 120, 122, 124, and 126. As shown in the example of FIG. 1, the one or more cameras 154 can be used to monitor one or more burning operations of the one or more burners 152, which may aim to facilitate control of such one or more burning operations at least in part through analysis of image data acquired by at least one of the one or more cameras 154.

FIG. 2 shows an example of a system 250, which may be referred to as a surface well testing system. The system 250 can include various features of the system 110 of FIG. 1. Various equipment of the system 250, such as flaring equipment, may be present at one or more types of sites (e.g., production sites, well testing sites, etc.).

In FIG. 2, a multiphase fluid (represented here by arrow 252) enters a flowhead 254 and is routed to a separator 270 through a surface safety valve 256, a steam-heat exchanger 260, a choke manifold 262, a flow meter 264, and an additional manifold 266. In the example of FIG. 2, the system 250 includes a chemical injection pump 258 for injecting chemicals into the multiphase fluid flowing toward the separator 270.

In the depicted embodiment of FIG. 2, the separator 270 is a three-phase separator that generally separates the multiphase fluid 252 into gas, oil, and water components. The separated gas is routed downstream from the separator 270 through a gas manifold 274 to either of the burners 276-1 and 276-2 for flaring gas and burning oil. The gas manifold 274 includes valves that can be actuated to control flow of gas from the gas manifold 274 to one or the other of the burners 276-1 and 276-2. Although shown next to one another in FIG. 2 for sake of clarity, the burners 276-1 and 276-2 may be positioned apart from one another, such as on opposite sides of a rig, etc.

As shown, the separated oil from the separator 270 can be routed downstream to an oil manifold 280. Valves of the oil manifold 280 can be operated to permit flow of the oil to either of the burners 276-1 and 276-2 or either of the tanks 282 and 284. The tanks 282 and 284 can be of a suitable form, but are depicted in FIG. 2 as vertical surge tanks each having two fluid compartments. This allows each tank to simultaneously hold different fluids, such as water in one compartment and oil in the other compartment. An oil transfer pump 286 may be operated to pump oil through the well testing system 250 downstream of the separator 270. The separated water from the separator 270 can be similarly routed to a water manifold 290. Like the oil manifold 280, the water manifold 290 includes valves that can be opened or closed to permit water to flow to either of the tanks 282 and 284 or to a water treatment and disposal apparatus 294. A water transfer pump 292 may be used to pump the water through the system.

A well test area in which the well testing system 250 (or other embodiments of a well testing system) is installed may be classified as a hazardous area. In some embodiments, the well test area is classified as a Zone 1 hazardous area according to International Electrotechnical Commission (IEC) standard 60079-10-1:2015.

In the example of FIG. 2, a cabin 296 at a wellsite may include various types of equipment to acquire data from the well testing system 250. These acquired data may be used to monitor and control the well testing system 250. In at least some instances, the cabin 296 can be set apart from the well test area having the well testing system 250 in a non-hazardous area. This is represented by the dashed line 298 in FIG. 2, which generally serves as a demarcation between the hazardous area having the well testing system 250 and the non-hazardous area of the cabin 296.

The equipment of a system can be monitored during a process to verify proper operation and facilitate control of the process. Such monitoring can include taking numerous measurements, examples of which can include choke manifold temperature and pressures (upstream and downstream), heat exchanger temperature and pressure, separator temperature and pressures (static and differential), oil flow rate and volume from the separator, water flow rate and volume from the separator, and fluid levels in tanks of a system.

As an example, a mobile monitoring system may be provided. In such an example, monitoring of a process can be performed on a mobile device (e.g., a mobile device suitable for use in Zone 1 hazardous area, like the well test area). Various types of information may be automatically acquired by sensors and then presented to an operator via the mobile device. The mobile monitoring system may provide various functions, such as a sensor data display, video display, sensor or video information interpretation for quality-assurance and quality-control purposes, and a manual entry screen (e.g., for a digital tally book for recording measurements taken by the operator).

Figure 3:
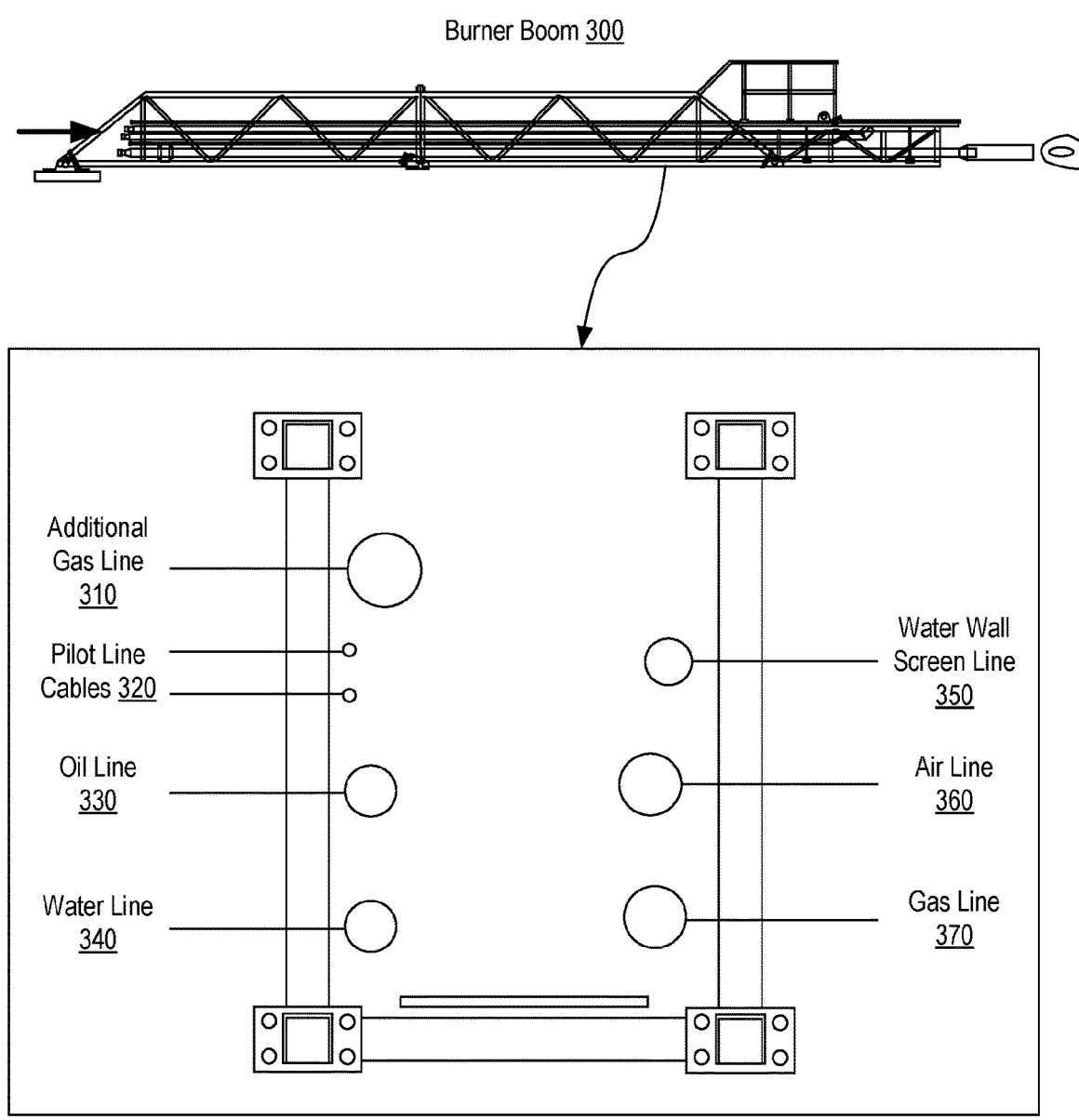
FIG. 3 is a diagram of an example of a burner boom.

FIG. 3 shows an example of a burner boom 300, which can be configured for horizontal mounting, mounting at an angle, vertical mounting, etc. For example, the burner boom 300 can be mounted on a rig with a rotating base plate and guy lines. In such an example, horizontal guy lines can help to orient the burner boom 300; vertical guy lines, which are fixed to the rig's main structure, can support the burner boom 300. A rotating base can enable horizontal and vertical positioning of the burner boom 300 and its burner. As an example, the burner boom 300 may be positioned slightly above horizontal so that oil left in piping after flaring operations does not leak out. Flaring equipment such as the burner boom 300 may be present at one or more types of sites (e.g., production sites, well testing sites, etc.) to provide for flaring operations.

As an example, a burner can be boom mounted or mounted on another type of support structure. As an example, a structure can support various conduits that provide fluid such as, for example, one or more of air, water, oil, and propane.

In the example of FIG. 3, conduits or lines include an additional gas line 310, pilot line cables 320, an oil line 330, a water line 340, a water wall screen line 350, an air line 360, and a main gas line 370.

As to the burner boom 300 of FIG. 3, its burner can be configured and controlled to perform in a desirable manner. For example, it may be desired to burn in a fallout-free and smokeless manner for combustion of liquid hydrocarbons produced during well testing. As an example, a burner geometry can utilize pneumatic atomization and enhanced air induction. As an example, a burner can be equipped with one or more pilots, a flame-front ignition system (BRFI), and a built-in water screen to reduce heat radiation. As an example, a burner can be fitted with an automatic shutoff valve that prevents oil spillage at the beginning and end of a burning run.

As to burner control, a burner can include a high turndown feature (e.g., 1:5), which may be optionally further extended to a higher ratio (e.g., 1:30) using a multirate kit (BMRK) option, which allows for selecting the number of operating nozzles. For onshore operations, a skid may be utilized for skid-mounting.

As to burner efficiency, a burner may be suited for high efficiency burning with one or more types of oil (e.g., including particularly heavy and waxy oils). As an example, a burner may operate effectively up to a water cut rating (e.g., up to 25 percent water cut), which may be desirable for various types of cleanup operations.

As a burner may be operational in a manner that provides for substantially no liquid fallout and substantially no visible smoke emissions, such a burner may be particularly suited for operations in environmentally sensitive areas.

Figure 4:
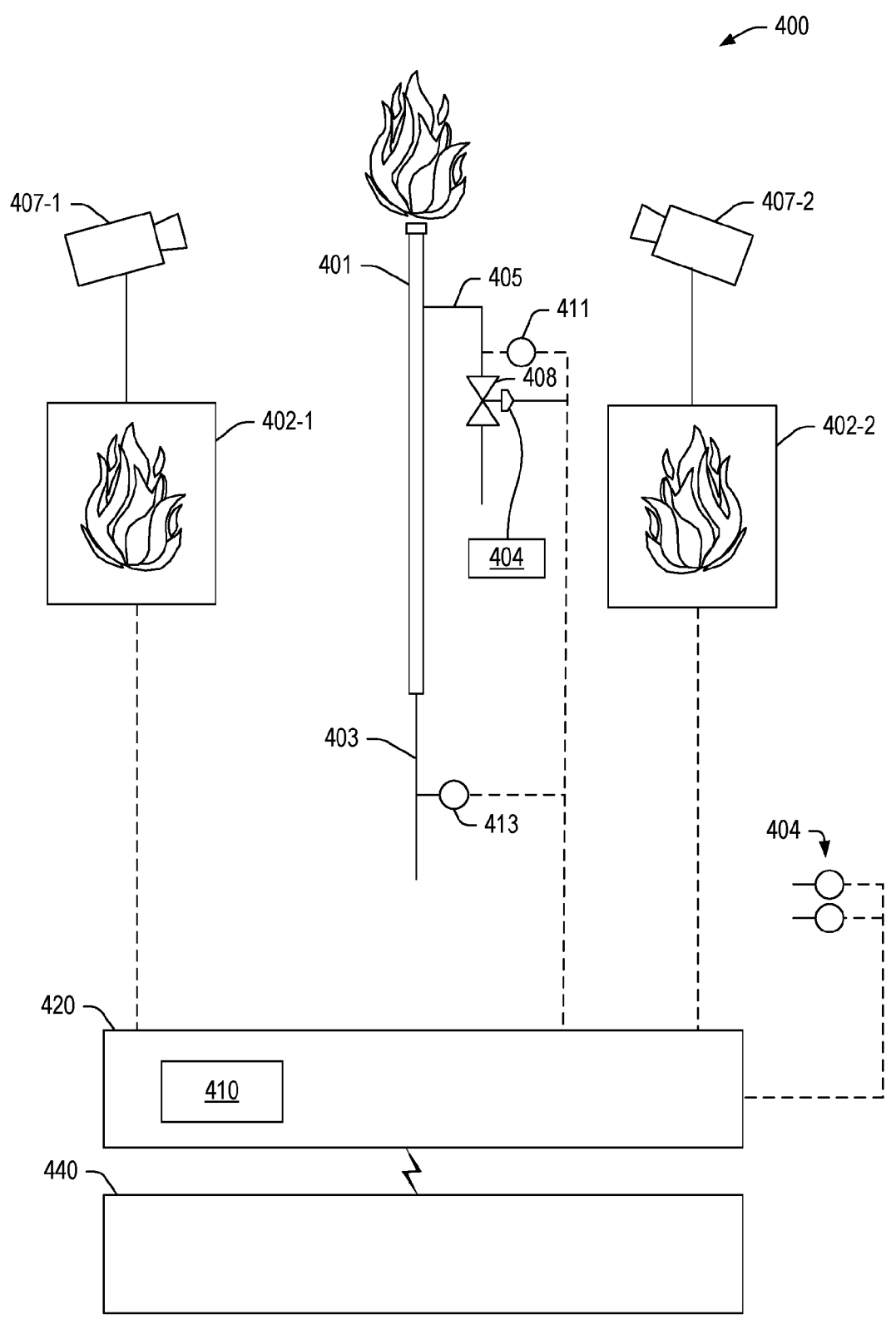
FIG. 4 is a diagram of an example of a burner system.

FIG. 4 is a system diagram of an example of a burner control system 400. The system 400 includes at least one camera 407-1 and 407-2 positioned to capture one or more images 402-1 and 402-2 of a flare emitted by a burner 401. In the example of FIG. 4, two cameras 407-1 and 407-2 are shown capturing images 402-1 and 402-2 from different locations to acquire image data from more than one image plane of the flare. The burner 401 includes a fuel feed 403 that flows fuel to the burner 401 (see, e.g., the burners 276-1 and 276-2 of FIG. 2, the burner 300 of FIG. 3, etc.). The burner 401 also includes an air feed 405 that flows air to the burner 401. Flow rate of the air feed 405 is controlled by a control valve 408, where an air flow sensor 411 senses flow rate of air into the burner 401. A fuel flow sensor 413 senses flow rate of fuel to the burner 401. Other sensors 404, along with the at least one camera 407-1 and 407-2, are operatively coupled to local electronic equipment 420. The sensors 404 may sense, and produce signals representing, combustion effective parameters such as temperature, wind speed, and ambient humidity. The sensors 404, 411, and 413, and the cameras 407-1 and 407-2 send data, including data representing the images 402-1 and 402-2, along with data representing readings of the sensors 404, 411, and 413, directly and/or indirectly, to the local electronic equipment 420, which may be present at a wellsite in a production phase and/or a drilling phase (e.g., in a doghouse, a cabin, etc.). The data sent to the local electronic equipment 420 can represent a state of combustion taking place at the burner 401.

As shown in the example of FIG. 4, the local electronic equipment 420 can be in communication with remote electronic equipment 440. For example, consider use of one or more wired and/or wireless interfaces that allow for communications between the local and remote electronic equipment 420 and 440. In such an example, various computational tasks may be executed locally and/or remotely. For example, consider a local computing device that can include an application that can render a graphical user interface (GUI) to a display. In such an example, the GUI can include control graphics that are selectable to issue instructions such as, for example, one or more application programming interface (API) calls, which may be directed to the local electronic equipment 420, the remote electronic equipment 440, etc., to cause one or more actions to occur such as formulation of a response to an API call.

As an example, the local and remote electronic equipment 420 and 440 may be configured in a client-server arrangement where the local electronic equipment 420 operates as a client and the remote electronic equipment 440 operates as a server. As an example, data acquired by the local electronic equipment 420 (e.g., as part of the system 400) may be processed for local control and/or transmitted (e.g., as raw and/or processed data) for processing, storage, etc., by the remote electronic equipment 440. As an example, the remote electronic equipment 440 can include one or more cloud-based resources. In such an example, the remote electronic equipment 440 may provide services such as, for example, software as a service. As an example, control effectuated by the system 400 to control the burner 401 can be based on local and/or remote computing (e.g., using the local electronic equipment 420, the remote electronic equipment 440, etc.).

As to control of a burner, a model can be used, which may be a physics-based model, a machine learning model, a hybrid model, etc. As an example, a model-based approach can allow for prediction of various parameters such as, for example, air control parameters based on the data from the sensors 404, 411, and 413 and the at least one of the one or more cameras 407-1 and 407-2. As an example, one or more air control parameters can be applied to the control valve 408 to control air supply to the burner 401, which can be part of a combustion process that generates a flare that can be captured, as depicted in the one or more images 402-1 and 402-2.

Camera as used herein, means an imaging device. A camera can capture an image of electromagnetic (EM) radiation in a medium that can be converted to data for use in digital processing. The conversion can take place within the camera or in a separate processor. The camera may capture images in one wavelength or across a spectrum (e.g., or spectra), which may encompass the ultraviolet (UV) spectrum, the visible spectrum, and/or the infrared spectrum. For example, a camera may capture an image of wavelengths from approximately 350 nm to approximately 1,500 nm. As an example, one or more of a broad spectrum imaging device such as a LIDAR detector, a narrower spectrum detector such as a charged-coupled device (CCD) array, and a short-wave infrared detector can be used as an imaging device or as imaging devices. Cameras can be monovision cameras or stereo cameras.

In the example of FIG. 4, the local electronic equipment 420 is shown as including an image processing unit 410, which may include and/or be operatively coupled to a model or models for purposes of processing one or more of the images 402-1 and 402-2 as captured by the at least one camera 407-1 and 407-2. As an example, a data set, along with sensor data representing oil flow rate, gas flow rate, water or steam flow rate, air flow rate, pressure, temperature, wind speed, ambient humidity, and other combustion effective parameters, can be considered different types of inputs. As an example, a model can receive input or inputs and can output one or more air control parameters, such as flow rate, pressure, and/or temperature, for the burner 401 (e.g., or burners) controlled by the system 400.

As to a machine learning model (ML model), such a model can be a neural network model (NN model). As an example, a trained ML model can be utilized to control one or more burners. As an example, a trained ML model can be trained with respect to a particular burner and/or type of burner. In such an approach, a trained ML model can be selected based at least in part on burner specifications (e.g., manufacturer, model, features, history, etc.).

Various types of data may be acquired and optionally stored, which may provide for training one or more ML models and/or for offline analysis, etc. For example, air control parameters output by a trained NN model can be stored in digital storage for later analysis, which may include further training, training a different ML model, etc. During control of an ongoing burning operation, one or more air control parameters can be transmitted to one or more control valves that control air supply to one or more burners as may be operatively coupled to the system controlled by the control system. Subsequent images and sensor data acquisitions can be captured, and the control cycle repeated as many times as desired. Frequency of repetition can depend on various time constants of the system 400. As an example, a cycle may be as short as a fraction of a second or as long as five to ten minutes. As an example, consider a 1 Hz operational frequency where several images are captured in a one second interval as in a video feed where computing air control parameters and applying the computed air control parameters to a control valve controlling air supply to the burner are based on the images in the one second interval. As an example, video may be live, with some amount of latency due to transmission and processing time, or video may be deliberately delayed by a delay amount.

As an example, the image processing unit 410 can convert signals derived from photons received by the one or more cameras 407-1 and 407-2 into data. The image processing unit 410 may be within or separate from a camera. As an example, the image processing unit 410 can convert signals received from the one or more cameras 407-1 and 407-2 into digital data representing photointensity in defined areas of the image and can assign position information to each digital data value. As an example, photointensity may be deconvolved into constituent wavelengths to produce a spectrum for each pixel. Such a spectrum may be sampled in defined bins, and the data from such sampling structured into a data set representing spectral intensity of the received image, for example, as a function of x-y position in the image. As an example, a timestamp can be added. For example, camera circuitry can include a digital clock and/or network circuitry that can receive a clock signal.

As an example, an image can be a pixel image with pixel position coordinate, a pixel depth and a timestamp. As to depth, various conventions may be utilized and depend on equipment and/or processing. Where color is utilized, a color depth can be referenced. For example, 8-bit color and 24-bit color can be the same where, in an RGB color space, 8-bits refers to each R, G, and B (e.g., subpixel), while 24-bit is a sum of the three 8-bit channels (e.g., 3×8=24). Standards can include, for example, monochrome (e.g., 1-bit) to 4K (e.g., 12-bit color, which provides 4096 colors), etc.

As to color models, RGB can be mapped to a cube. For example, a horizontal x-axis can be a red axis (R) for red values, a y-axis can be a blue axis (B) for blue values, and a z-axis can be a green axis (G) for green values. The origin, of such a cube (e.g., 0, 0, 0) can be black and an opposing point can be white (e.g., 1, 1, 1).

Another type of color model is the Y'UV model, which defines a color space in terms of one luma component (Y') and two chrominance components, called U (blue projection) and V (red projection), respectively. The Y'UV color model is used in the PAL composite color video (excluding PAL-N) standard.

Yet another type of color model is the HSV color model. The RGB color model can define a color as percentages of red, green, and blue hues (e.g., as mixed together) while the HSV color model can define color with respect to hue (H), saturation (S), and value (V). For the HSV color model, as hue varies from 0 to 1.0, corresponding colors vary from red through yellow, green, cyan, blue, magenta, and back to red (e.g., red values exist at both at 0 and 1.0); as saturation varies from 0 to 1.0, corresponding colors (hues) vary from unsaturated (e.g., shades of gray) to fully saturated (e.g., no white component); and as value, or brightness, varies from 0 to 1.0, corresponding colors become increasingly brighter.

Saturation may be described as, for example, representing purity of a color where colors with the highest saturation may have the highest values (e.g., represented as white in terms of saturation) and where mixtures of colors are represented as shades of gray (e.g., cyans, greens, and yellow shades are mixtures of true colors). As an example, saturation may be described as representing the "colorfulness" of a stimulus relative to its own brightness; where "colorfulness" is an attribute of a visual sensation according to which the perceived color of an area appears to be more or less chromatic and where "brightness" is an attribute of a visual sensation according to which an area appears to emit more or less light.

As an example, a method for assessing imagery can include accessing one or more resources as to color models (e.g., as a plug-in, external executable code, etc.). For example, consider a method that includes instructions to access an algorithm of a package, a computing environment, etc., such as, for example, the MATLAB computing environment (marketed by MathWorks, Inc., Natick, MA). The MATLAB computing environment includes an image processing toolbox, for example, with algorithms for color space (e.g., color model) conversions, transforms, etc. As an example, the MATLAB computing environment includes functions "rgb2hsv" and "hsv2rgb" to convert images between the RGB and HSV color spaces (see, e.g., http://www.mathworks.com/help/images/converting-color-data-between-color-spaces.html).

FIG. 5 shows an example of a method 500 along with an example of a RGB color model 502 and a HSV color model 504 (e.g., where colors are represented by their first letter). In the example of FIG. 5, RGB data 522, 524 and 526 are provided from one or more sources. As shown, a transformation block 550 can transform the continuous RGB color model representation of the data 522, 524 and 526 as H band data 562, V band data 564 and/or S band data 566 for HSV bands of the HSV color model 504. As an example, an algorithm that provides for conversion of RGB data to HSV data may be implemented, optionally with zero filling, etc., for example, where less than three sets of data are provided (e.g., two of data 522, 524 and 526).

Figure 6:
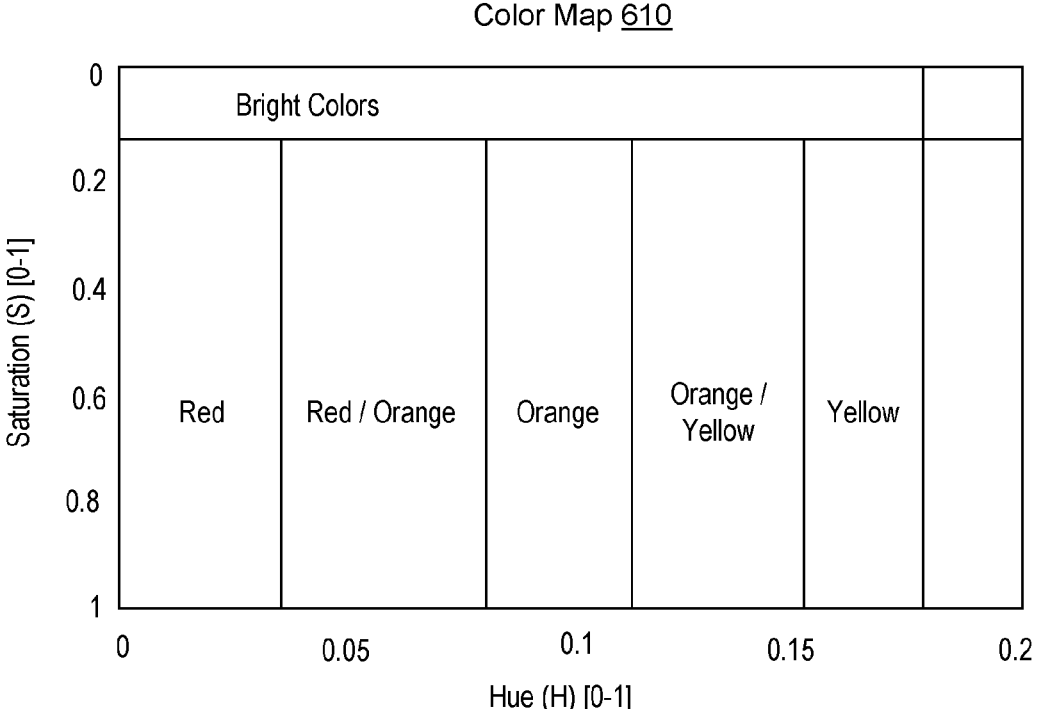
FIG. 6 is a diagram of an example of a color map.

FIG. 6 shows an example of a color map 610, which includes hue (H) and saturation (S) coordinates (e.g., of an HSV color model). As shown, the hue includes a range from red and transitions to red/orange, orange, orange/yellow and yellow.

Colors of a flame can depend on temperature of the flame and the material being burned. The colder part of a diffusion (incomplete combustion) flame tends to be red, transitioning to orange, yellow, and white as the temperature increases as evidenced by changes in the black-body radiation spectrum. A blue-colored flame can emerge when amount of soot decreases and blue emissions from excited molecular radicals become dominant. For example, the orange in a campfire depends on temperature and sodium in firewood while blue streaks can come from carbon and hydrogen in the firewood. In another example, the colors of stars can also indicate their temperatures. The closest star to Earth, the sun, has a surface temperature of approximately 5538° C. (10,000° F.).

In general, red can be observed, for example, in a range of temperatures from approximately 525° C. (977° F.) to approximately 1000° C. (1,830° F.); orange can be observed in a range from approximately 1100° C. (2,010° F.) to approximately 1200° C. (2,190° F.) and white can be observed in a range from approximately 1300° C. (2,370° F.) to approximately 1500° C. (2,730° F.).

As an example, a method or a system can include a smoke chart (e.g., consider a Ringelmann smoke chart, etc.), which may include different graduated maps. The Ringelmann system can include graduated shades of gray, for example, consider five equal steps between white and black.

As explained, a site may include one or more types of monitoring and/or control systems for burner operations. However, such types of system may depend on local monitoring equipment (e.g., one or more local cameras). In such an example, where it is desirable to monitor and/or control one or more operations at a larger number of wellsites (e.g., or burner sites, etc.), each of the sites may be expected to have operational monitoring equipment. As various sites do not have operational monitoring equipment and/or communication links to such equipment, a system may operate using one or more types of areal observation data such as, for example, one or more types of satellite data.

As an example, a system can be a multisite system that can aggregate data for purposes of methane monitoring and/or abatement. As an example, information acquired locally at one or more sites (e.g., camera data, processed camera data, operational data, etc.) may be utilized in combination with one or more types of satellite data and/or other data. For example, a method can include assessing satellite data (e.g., raw or processed) using information acquired locally at one or more sites. In such an example, data indicative of flaring in satellite data may be characterized using information acquired locally, which may characterize a satellite observed flare more specifically (e.g., as to chemical and/or spectral emissions, efficiency, etc.). In such an approach, satellite data can be enriched by locally acquired data, which may facilitate training of one or more ML models that can classify flares (e.g., as lit and/or unlit).

Figure 7:
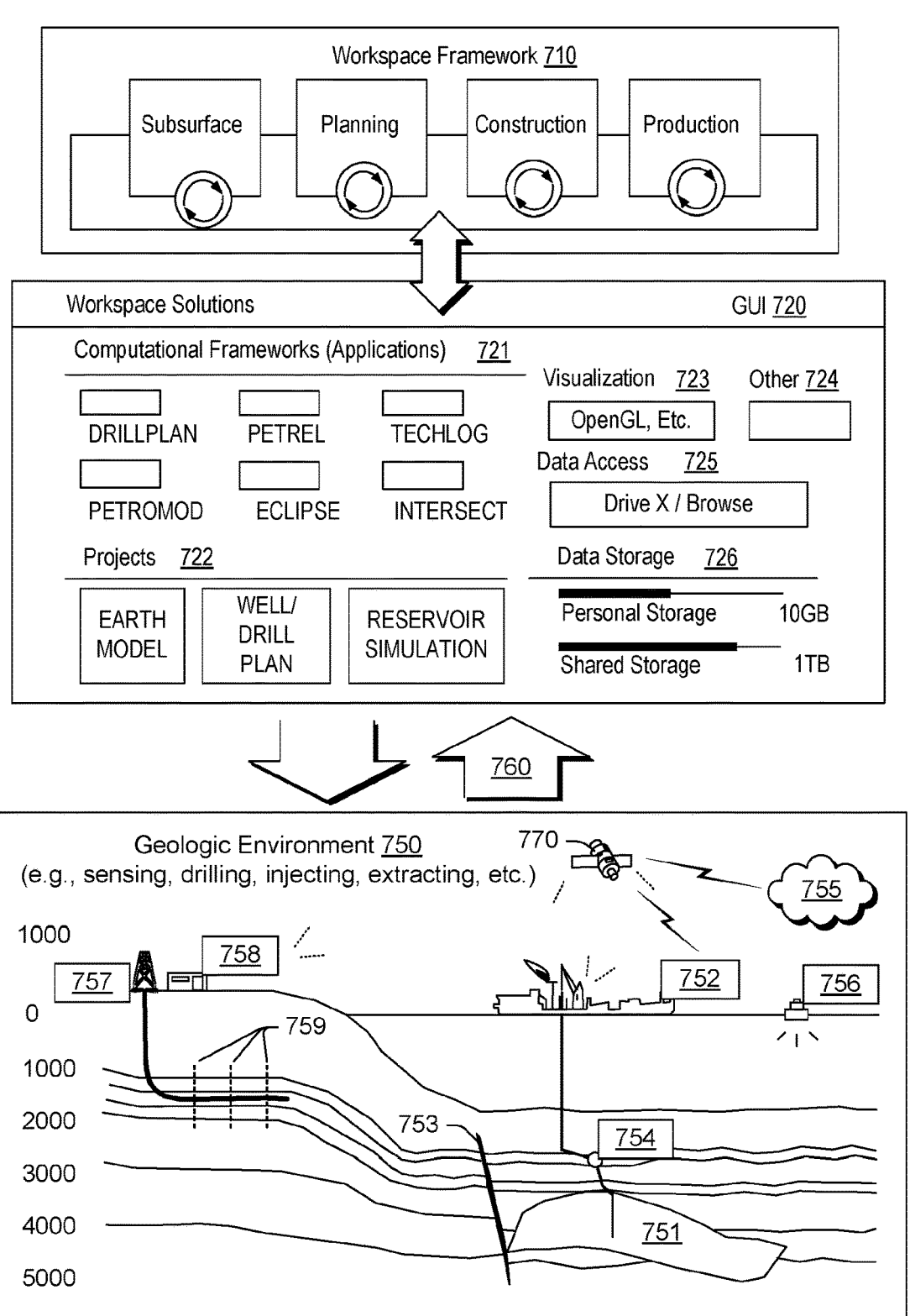
FIG. 7 is a diagram of an example of a system and an example of a geologic environment.

FIG. 7 shows an example of a system 700 that includes a workspace framework 710 that can provide for instantiation of, rendering of, interactions with, etc., a graphical user interface (GUI) 720. In the example of FIG. 7, the GUI 720 can include graphical controls for computational frameworks (e.g., applications) 721, projects 722, visualization 723, one or more other features 724, data access 725, and data storage 726.

In the example of FIG. 7, the workspace framework 710 may be tailored to a particular geologic environment such as an example geologic environment 750. For example, the geologic environment 750 may include layers (e.g., stratification) that include a reservoir 751 and that may be intersected by a fault 753. As an example, the geologic environment 750 may be outfitted with a variety of sensors, detectors, actuators, etc. For example, equipment 752 may include communication circuitry to receive and to transmit information with respect to one or more networks 755. Such information may include information associated with downhole equipment 754, which may be equipment to acquire information, to assist with resource recovery, etc. Other equipment 756 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 7 shows a satellite 770 in communication with the network 755 that may be configured for communications, noting that the satellite may additionally or alternatively include circuitry for imagery (e.g., spatial, spectral, temporal, radiometric, etc.).

FIG. 7 also shows the geologic environment 750 as optionally including equipment 757 and 758 associated with a well that includes a substantially horizontal portion that may intersect with one or more fractures 759. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 757 and/or 758 may include components, a system, systems, etc. for fracturing, seismic sensing, analysis of seismic data, assessment of one or more fractures, etc.

In the example of FIG. 7, the GUI 720 shows some examples of computational frameworks, including the DRILLPLAN, PETREL, TECHLOG, PETROMOD, ECLIPSE, and INTERSECT frameworks (Schlumberger Limited, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive exploration and production (E&P) environment (Schlumberger Limited, Houston, Texas), referred to as the DELFI environment, for utilization in geosciences and geo-engineering, for example, to analyze subsurface data from exploration to production of fluid from a reservoir.

The DELFI environment is a secure, cognitive, cloud-based collaborative environment that integrates data and workflows with digital technologies, such as artificial intelligence and machine learning. As an example, such an environment can provide for operations that involve one or more frameworks. The DELFI environment may be referred to as the DELFI framework, which may be a framework of frameworks. As an example, the DELFI framework can include various other frameworks, which can include, for example, one or more types of models (e.g., simulation models, machine learning models, etc.).

The TECHLOG framework can handle and process field and laboratory data for a variety of geologic environments (e.g., deepwater exploration, shale, etc.). The TECHLOG framework can structure wellbore data for analyses, planning, etc.

The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (chemical EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI environment, for example, for rapid simulation of multiple concurrent cases. For example, a workflow may utilize one or more of the DELFI environment on demand reservoir simulation features.

The aforementioned DELFI environment provides various features for workflows as to subsurface analysis, planning, construction and production, for example, as illustrated in the workspace framework 710. As shown in FIG. 7, outputs from the workspace framework 710 can be utilized for directing, controlling, etc., one or more processes in the geologic environment 750 and, feedback 760, can be received via one or more interfaces in one or more forms (e.g., acquired data as to operational conditions, equipment conditions, environment conditions, etc.).

In the example of FIG. 7, the visualization features 723 may be implemented via the workspace framework 710, for example, to perform tasks as associated with one or more of subsurface regions, planning operations, constructing wells and/or surface fluid networks, and producing from a reservoir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter such that features can be integrated from different codes for purposes of visualization, communication, etc.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As an example, a model may be a simulated version of an environment, which may include one or more sites of possible emissions. As an example, a simulator may include features for simulating physical phenomena in an environment based at least in part on a model or models. A simulator, such as a weather simulator, can simulate fluid flow in an environment based at least in part on a model that can be generated via a framework that receives satellite data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model (e.g., of the Earth, the atmosphere, the oceans, etc.).

While several simulators are illustrated in the example of FIG. 7, one or more other simulators may be utilized, additionally or alternatively. For example, consider the VISAGE geomechanics simulator (Schlumberger Limited, Houston Texas) or the PIPESIM network simulator (Schlumberger Limited, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, CO2 disposal, etc. The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (Schlumberger Limited, Houston Texas).

As an example, observational data such as data from one or more satellites may be utilized in the DELFI environment for one or more purposes. For example, consider integration with one or more types of frameworks. As mentioned, the VISAGE framework can perform methods concerning CO2 (e.g., CO2 disposal, etc.) and the PIPESIM framework can perform methods considering surface operations (e.g., consider gas production, separations of gas, artificial lift using gas, gas flaring, etc.).

As an example, a system can monitor flares from space and detect when flares are unlit by fusing geospatial data from multiple sources and alerting when issues are detected. In such an example, an alert may be issued via a network interface to one or more destinations, which may include workstations, controllers, etc.

As to some examples of satellites, consider during night-time, the Visible Infrared Imaging Radiometer Suite (VIIRS) sensor, which exists on the NOAA-20 satellite, which can be used for detecting and characterizing combustion sources. As another example, during daytime, the TROPOspheric Monitoring Instrument (TROPOMI) sensor, which is onboard on the Sentinel 5P Precursor satellite, from the European Space Agency (ESA) uses a short-wave infrared radiation sensor can measure methane concentrations on columns with a base area of 7×3.5 km². As yet another example, consider the Sentinel 3 satellite with the Sea and Land Surface Temperature Radiometer (SLSTR) instrument from the European Space Agency (ESA), which is also used to measure gas flares and give confidence to the VIIRS sensor. Yet another example is the Sentinel 2 satellite, which, as mentioned, has a resolution as fine as 20 m×20 m.

The VIIRS sensor provides for observation of gas flaring. At night, the VIIRS sensor records data in three near- to short-wave infrared channels (NIR and SWIR) designed for daytime imaging. With sunlight eliminated (e.g., night time), features detected in these three channels include combustion sources. The shortwave IR channel, at 1.61 μm, is at a wavelength at, or proximate to, peak radiant emissions from gas flares. The 4-μm channel, widely used in satellite fire detection, detects large flares due to the fact that it falls on the trailing edge of gas flare radiant emissions and observes a mixture of flare plus background radiant emissions. Generally, flare radiant emissions in the 4-μm channel are about a third of the emissions at 1.65 μm, which limits detection of smaller flares in standard satellite fire products based on channels set at the 4 μm wavelength. An article by Elvidge et al., Methods for Global Survey of Natural Gas Flaring from Visible Infrared Imaging Radiometer Suite Data, Energies 2016, 9, 14 (December 2015), is incorporated herein by reference in its entirety.

As an example, a method can include accessing satellite data as raw data and/or as processed data. For example, processed satellite data as to radiant heat and/or flow rate measurements can be received, which may be associated with flares (e.g., identified and/or not identified in the processed satellite data).

As an example, images from satellites, environmental data from weather stations, and high frequency satellite imagery can be fed to a system and processed to identify unlit flares.

FIG. 8 shows example imagery 810 and imagery with a graphical user interface 830. The imagery 810 shows a combination of TROPOMI and flares from VIIRS satellite data for a region of Algeria. The imagery 810 shows methane mixing ratio on the grid where the markers indicate detected flares. The flares are sized based on amount of radiant heat that is output. As to the imagery and GUI 830, it shows some testing related operations in Algeria based on an event where a flare had gone off where the lower portion is an alternative or additional way to render VIIRS and TROPOMI data. As explained, imagery can provide data as to one or more types of flares for one or more types of flaring operations (e.g., production, well testing, etc.).

High levels of gas flaring can present various types of issues for producers of hydrocarbons, which can include environmental issues, human safety issues, regulatory issues, etc. For example, consider gas exports under the European Union's carbon border adjustment mechanism (CBAM), which aims to introduce a tax on some products imported into the European Union (EU) based on carbon content, which may include crude oil or petroleum products. Such regulations may impact a region such as Algeria which, in 2020, exported 35 percent (approximately 364,000 b/d) of its total crude oil production to the EU. Data from the World Bank Group's Global Gas Flaring Reduction Partnership (GGFR) showed that Algeria flared some 9.3 bcm in 2020, making it the fifth-largest flarer in the world; noting that there was a slight reduction on the 9.34 bcm of 2019. Algeria's flare intensity, defined as gas flared per barrel of oil produced, was approximately 22.7 m³/bbl, which is the second-highest worldwide behind Venezuela, and higher than the global average of 5.1 m³/bbl. According to the GGFR, gas flaring satellite data from 2020 reveals that Russia, Iraq, Iran, the United States, Algeria, Venezuela and Nigeria remain the top seven gas flaring countries for nine years running, since the first satellite was launched in 2012. These seven countries produce 40 percent of the world's oil each year, but account for roughly two-thirds (65 percent) of global gas flaring.

Figure 9:
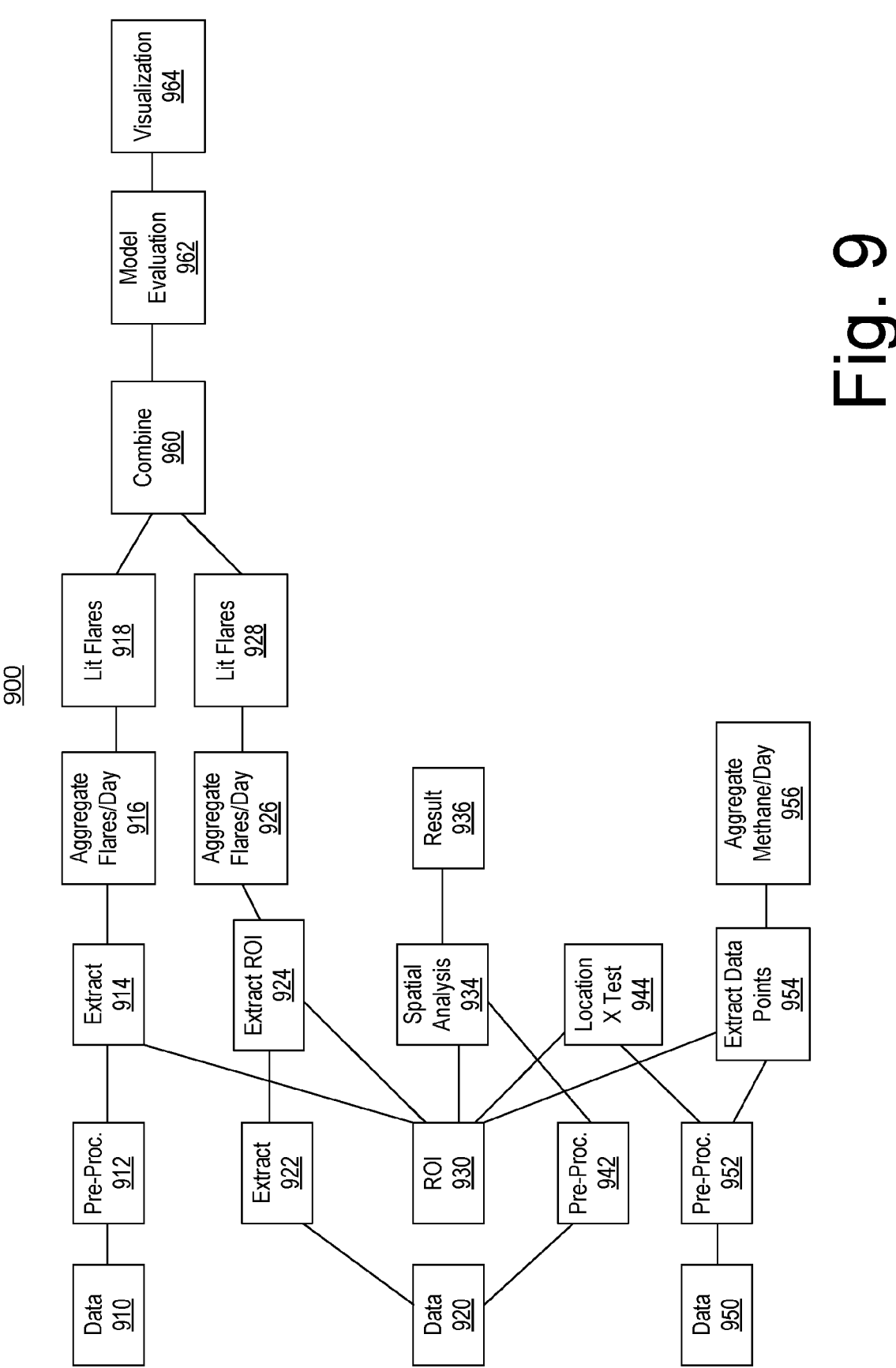
FIG. 9 is a diagram of an example of a workflow.

FIG. 9 shows an example of a workflow diagram 900. As shown, data can be acquired and processed to extract gas flares and pre-processed for spatial analysis. Such processing can be, for example, for aggregate flares per day, lit flares, etc., where various types of processed data can be combined, for example, to detect one or more unlit flares, etc. Such data may pertain to one or more regions of interest. As indicated, data can be processed for aggregate methane emissions per day.

In the example of FIG. 9, various sources of data 910, 920, and 950 are shown, which can provide data for processing. As an example, the source of data 910 can provide Sentinel 3 data, the source of data 920 can provide VIIRS data, and the source of data 950 can provide Sentinel 5P data. As explained, data sources can be satellites with appropriate sensors where the number of satellites and types of sensors may increase over time to thereby provide additional data sources. The example of FIG. 9 can utilize one or more of the data sources shown and/or one or more other data sources, currently available or available in the future. As shown, pre-processing blocks 912, 942, and 952 can process data, which may be considered pre-processing for one or more purposes. As shown, data that are pre-processed and/or raw can be subjected to extraction, which may be provided by one or more extraction blocks 914, 922, 924, and 954. In the example of FIG. 9, extraction may utilize one or more regions of interest as may be determined using a region of interest (ROI) block 930 and/or extraction may extract one or more regions of interest (ROIs). As an example, data may correspond to one or more test locations, as indicated by a location X test block 944. For example, consider using a combination of VIIRS data and Sentinel 5P data to provide output as to a test site. Such output may be suitable for use in controlling one or more operations at the test site, for example, to reduce or improve flaring. In such an example, the test site may be a site for production flaring, well test flaring, or one or more other types of flaring (e.g., oil and gas industry or another industry).

In the example of FIG. 9, data from the data source 950 may be suitable for aggregating methane production such as methane production rate on a daily basis as indicated by an aggregation block 956. As shown, aggregation blocks 916 and 926 may provide for aggregating flares per day types of data, which may be based on data such as Sentinel 3 data and VIIRS data, respectively. In such an approach, determinations as to lit flares may be made (e.g., and/or unlit flares), as indicated in the lit flares blocks 918 and 928.

As shown in FIG. 9, a spatial analysis block 934 can provide for spatial analysis of data from the data source 920, which may utilize information from the ROI block 930. In such an example, a result block 936 can provide for output of spatial analysis results (e.g., for one or more ROIs).

Referring again to the lit flares blocks 918 and 928, as mentioned, these can utilize data from different data sources (e.g., consider the data sources 910 and 920, etc.). Output from the lit flares blocks 918 and 928 can be combined per a combination block 960 where, for example, combined results can be utilized in model evaluation per a model evaluation block 962 and, for example, in visualization per a visualization block 964.

As an example, a process may be automated or semi-automated. For example, consider an automated process where data are automatically acquired from various sources and processed to generate output, which may be suitable for visualization and/or other analysis. As an example, output may be suitable for decision making, which can include control decisions as to equipment operations at one or more sites. As an example, a site or sites may be within an ROI or ROIs that can be tracked or otherwise monitored. In such an example, equipment operations at the site or sites may be classified, reported, controlled, etc., for one or more purposes (e.g., reduced flaring, improved flaring, regulatory reporting, etc.).

Figure 10:
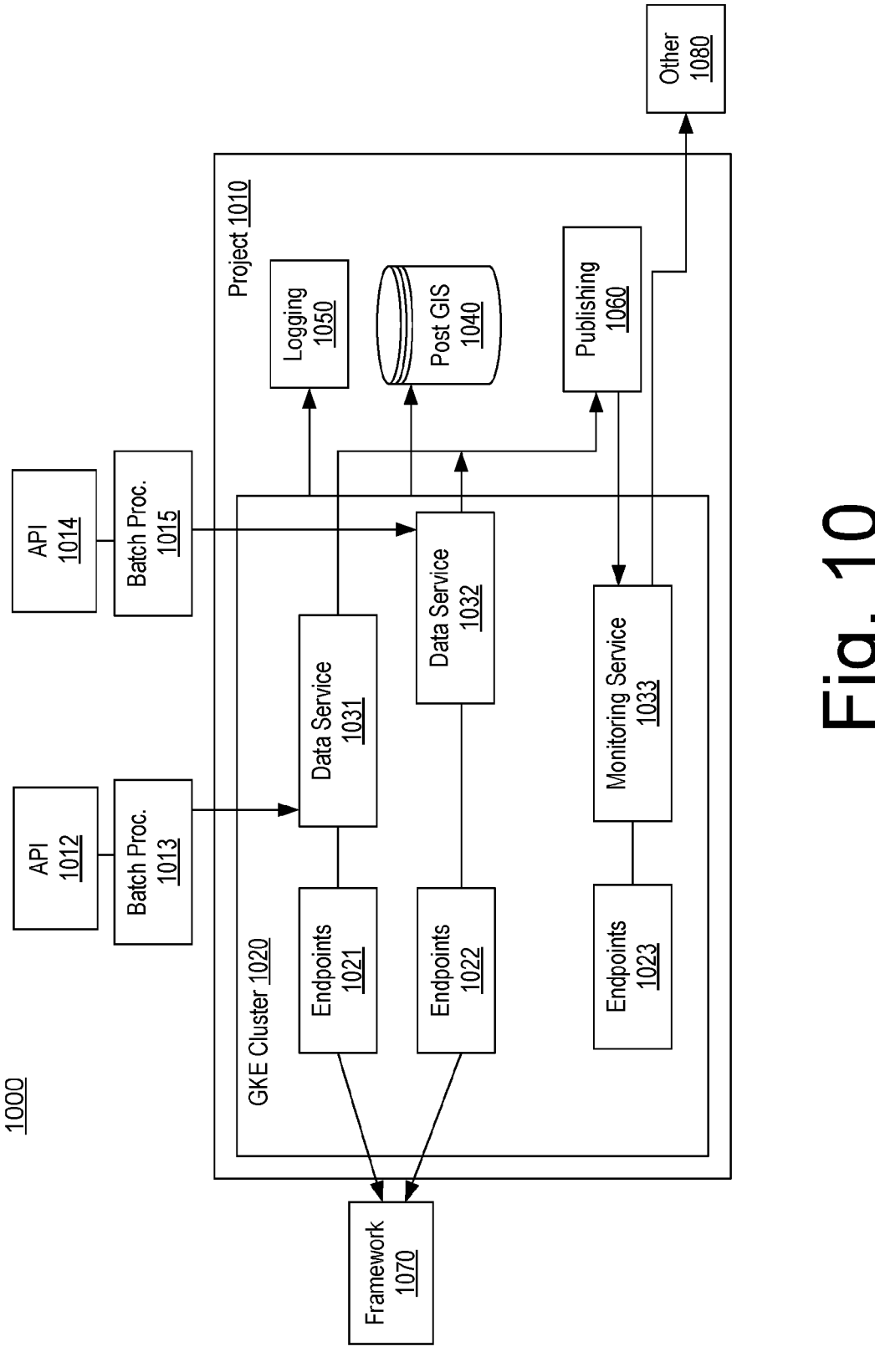
FIG. 10 is a diagram of an example of a system.

FIG. 10 shows an example of a system 1000, illustrated in an architectural form. In the example of FIG. 10, one or more application programming interfaces (APIs) 1012 and 1014 may be utilized, which can be source specific. For example, consider the API 1014 as being for Sentinel 5P data. To access such data, a POST request (e.g., an API call) can be transmitted to the Sentinel 5P process API where requested data are returned as a response. In such an approach, each POST request can be tailored for particular data, for example, by setting one or more parameters. As an example, the API 1012 may be for a data source that provides satellite imagery (e.g., Sentinel 1, Sentinel 2, etc.) through use of the Copernicus Open Access Hub (formerly known as the Sentinels Scientific Data Hub). Imagery from the Copernicus Open Access Hub can be made up of a mosaic of scenes based on zoom level, the size and location of an area of interest (AOI) (e.g., ROI). Where an ROI is small, an image may be from a single scene; noting that for larger ROIs, imagery may be created from several stitched-together scenes, which may be from the same date (e.g., timestamped, etc.). As an example, the SKYTRUTH data source may be accessed for processed data based on VIIRS radiant heat measurements.

As shown in the example of FIG. 10, the system 1000 can include batch processing blocks 1013 and 1015 that may control API requests where data can be routed to data service blocks 1031 and 1032 for data services such as, for example, a VIIRS data service and a TROPOMI data service. As shown in FIG. 10, the data services blocks 1031 and 1032 can be coupled to endpoint blocks 1021 and 1022, respectively, which may provide for extensible service proxy (ESP) endpoints. These can correspond to cloud platform endpoints, for example, for a GOOGLE Kubernetes Engine (GKE) cluster 1020 of a GOOGLE cloud project 1010 where Kubernetes refers to container-centric management software (Google LLC, Mountain View, California). While GOOGLE and Kubernetes are mentioned, the project 1010 and the cluster 1020 may be provided as being part of one or more types of cloud platforms or other computational cluster resources. For example, consider the AZURE cloud platform (Microsoft Corporation, Redmond, Washington). A cloud platform can include a cloud portal that can include one or more features of an AZURE portal, a GOOGLE portal, etc., that can manage, mediate, etc. access to one or more services, data, connections, networks, devices, etc. As an example, the AZURE DATABRICKS data analytics platform may be utilized, which include three environments for developing data intensive applications: DATABRICKS SQL, DATABRICKS Data Science & Engineering, and DATABRICKS Machine Learning. As an example, the AZURE DELTA LAKE open source storage layer may be utilized, which provides ACID transactions, scalable metadata handling, and unifies streaming and batch data processing while running on top of an existing data lake and being compatible with various APIs. In combination, DELTA LAKE and DATABRICKS allows for configurations based on workload patterns, which, for example, may be linked to availability of one or more data sources (e.g., satellites, etc.).

As shown in the example of FIG. 10, the cluster 1020 can provide data to a framework block 1070, which may provide, for example, a framework such as the DATAIKU framework (Dataiku, New York City, New York), which includes Data Science Studio (DSS) features. The DATAIKU framework can provide features to create, share, and reuse applications that leverage data and machine learning to extend and automate decision making; scale AI safely and effectively across dimensions (e.g., data, number of applications, number of employees leveraging AI, etc.); and deliver advanced analytics using various techniques at a relatively large data scale.

In the example of FIG. 10, the cluster 1020 can output information for GIS database posting per a post block 1040, output information for purposes of logging per a logging block 1050, output information for purposes of publishing per a publishing block 1060, output information for one or more other purposes per other block 1080, etc.

As shown, the cluster 1020 may include an ESP endpoints block 1023 and a monitoring service block 1033 that can be operatively coupled to the publishing block 1060. In such an example, information from the publishing block 1060 can be processed for purposes of monitoring to generate output, which may be other output per the other block 1080.

As explained, a system may utilize various APIs along with a data facility or framework, which may be a smart data facility. The system 1000 may be implemented using distributed and/or cloud-based resources, which may include GIS facilities. As shown, data can be processed, optionally in a batch manner on a nightly basis. As shown, various satellite related data services can be included for automatic and/or triggered access to satellite data.

As an example, a workflow can include reception of a list of locations (e.g., one or more areas of interest or regions of interest (AOI/ROI)) to monitor (e.g., consider selection through a graphical user interface of the DELFI environment, etc.); ingestion and processing of geospatial data from various different sources such as satellites or weather stations, for example, consider satellite data capable of detecting flares (e.g., NOAA-20 with VIIRS sensor to acquire data during night-time flyovers), consider processing techniques that may include data science techniques such as density based clustering over a time window that may be used to correct for the spatial jittering and mapping of consistent points to a fixed location over time, consider satellite databased atmospheric methane measurements (e.g., methane mixing ratio) such as from the Sentinel 5P Precursor with the TROPOMI sensor, which may be used to corroborate lit and/or unlit flares by looking at change amounts on atmospheric methane measurements (e.g., methane mixing ratio) within a time period and region, consider acquisition of additional satellite data capable of detecting flares (e.g., Sentinel 3 with the SLSTR instrument), which may be used to validate measurements from other satellites used for detecting flares such as NOAA-20 with the VIIRS sensor in an evaluation model for lit and/or unlit flare detection, consider satellite imagery that may be used to identify changes in an AOI/ROI, which may be attributed to flare status (e.g., lit flare and/or unlit flare), and consider utilization of weather data such as wind speed, wind direction and cloud cover, which may be used to adjust the processing and confidence of other geospatial measurement such as the methane atmospheric readings from the Sentinel 5P Precursor with the TROPOMI sensor; detection of an unlit flare candidate where, in response, additional data may be used to increase the confidence of the detection; and model-based output such as, for example, classification output as to lit flare and/or unlit flare detection, optionally with a confidence, for example, based on input parameters to the model.

As an example, output of a model with lit and/or unlit classification and confidence may result in an alert being sent out to one or more machines (e.g., addresses, etc.) concerned with a facility or region evaluated by the model. As an example, a system can provide one or more mechanisms for feedback such as, for example, user feedback based on outcome of alerts or lack thereof, which may be used to improve accuracy of one or more data science techniques (e.g., machine learning models, etc.) in evaluating lit flares and/or unlit flares via a model or models.

Figure 11:
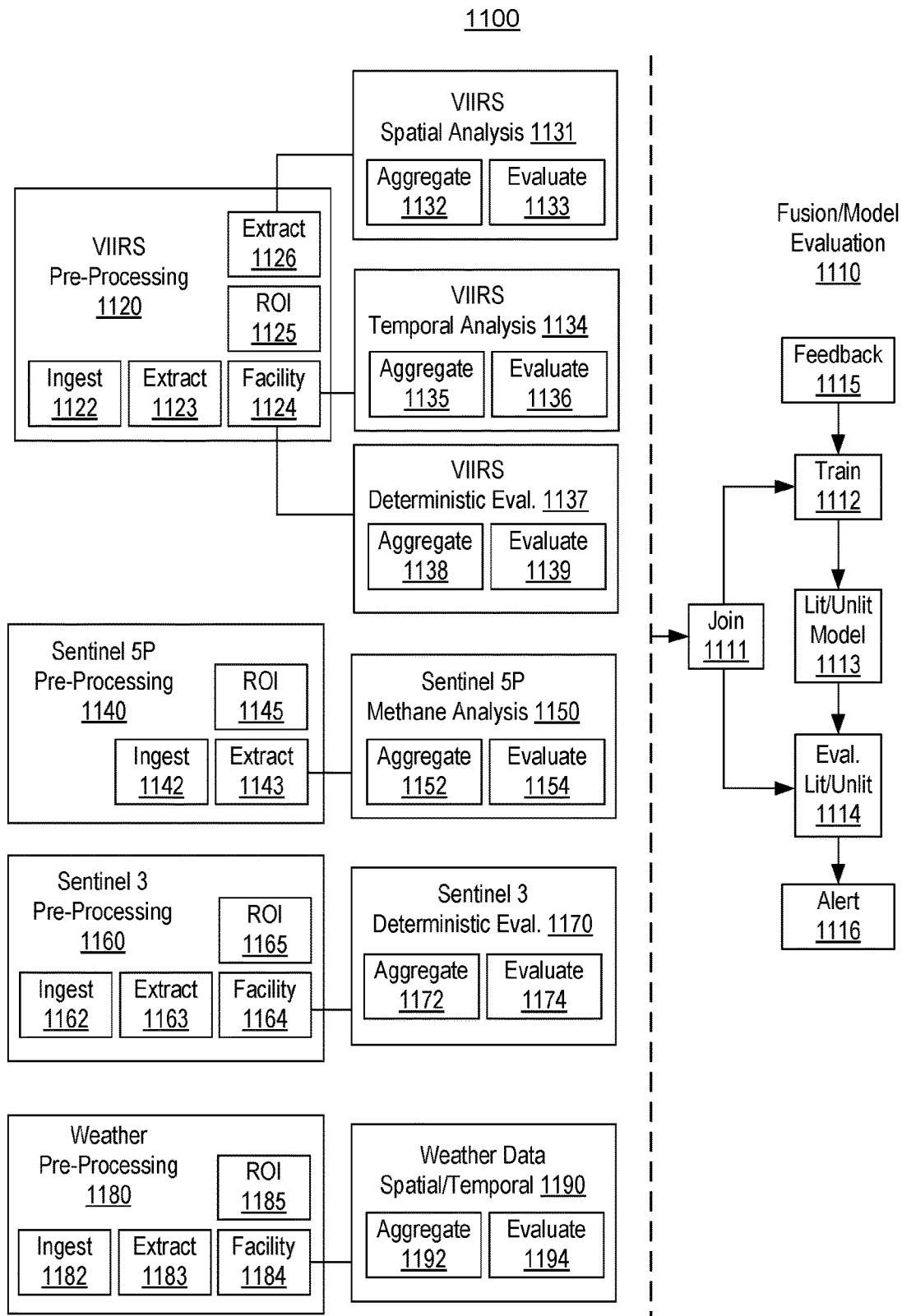
FIG. 11 is a diagram of an example of a system.

FIG. 11 shows an example of a system 1100 where various types of data can come from various sources. For example, consider VIIRS source data, Sentinel 5P source data, Sentinel 3 source data and weather data, noting that one or more alternative and/or additional types of source data may be included. For example, consider one or more of local site data, local control data, solar wind data, etc. As shown in FIG. 11, various data can be fused for model evaluation 1110.

In the example of FIG. 11, the system 1100 can include a VIIRS pre-processing block 1120 that includes an ingestion block 1122, an extraction block 1123, a facility block 1124, a ROI block 1125 and another extraction block 1126. In such an example, the extraction block 1123 can extract gas flares from ingested VIIRS data where, for example, the facility block 1124 can receive one or more ROIs from the ROI block 1125 to associate detected gas flares with one or more facilities. As shown, the extraction block 1126 may utilize one or more ROIs from the ROI block 1125 to extract gas flares on a ROI basis. In the example of FIG. 11, extracted findings from the VIIRS pre-processing block 1120 can be fed to one or more analysis and/or evaluation blocks 1131, 1134, and 1137. For example, the analysis block 1131 can provide for spatial analysis using an aggregation block 1132 for aggregating gas flares per day and an evaluation block 1133 for evaluating regional flare metrics, the analysis block 1134 can provide for temporal analysis using an aggregation block 1135 for aggregating gas flares over a timeframe (e.g., time window, etc.) and an evaluation block 1136 for evaluating metrics such as continuous and/or intermittent with respect to time, and the evaluation block 1137 can provide for deterministic evaluation using an aggregation block 1138 for aggregating gas flares per day and an evaluation block 1139 for evaluating flare presence and/or flare absence.

In the example of FIG. 11, the system 1100 can include a Sentinel 5P pre-processing block 1140 that includes an ingestion block 1142, an extraction block 1143, and a ROI block 1145. In such an example, the extraction block 1143 can extract methane information from ingested Sentinel 5P data where, for example, the ROI block 1145 can provide ROI information such that the extraction block 1143 extracts methane data per ROI. As shown, the output of the pre-processing block 1140 can be utilized in a Sentinel 5P methane analysis block 1150, which can include an aggregation block 1152 for aggregating methane data per day and an evaluation block 1154 for evaluating a methane mixing ratio signal.

In the example of FIG. 11, the system 1100 can include a Sentinel 3 pre-processing block 1160 that includes an ingestion block 1162, an extraction block 1163, a facility block 1164 and a ROI block 1165. In such an example, the extraction block 1163 can extract gas flares where the facilities block 1164 can receive ROI information from the ROI block 1165 to extract gas flares data on a per facilities basis. As shown, the output of the pre-processing block 1160 can be utilized in a Sentinel 3 deterministic evaluation 1170, which can include an aggregation block 1172 for aggregating gas flares per day and an evaluation block 1174 for evaluating flare classifications.

In the example of FIG. 11, the system 1100 can include a weather data pre-processing block 1180 that includes an ingestion block 1182, an extraction block 1183, a facility block 1184, and a ROI block 1185. In such an example, the extraction block 1183 can extract weather variables information (e.g., wind speed, direction, cloud cover, etc.) where the facilities block 1184 can receive ROI information from the ROI block 1185 to extract weather variables information on a per facilities basis. As shown, the output of the pre-processing block 1180 can be utilized in a weather data spatial and/or temporal analysis block 1190, which can include an aggregation block 1192 for aggregating weather data on a temporal basis and/or spatial basis and an evaluation block 1194 for evaluating weather variables.

As explained, various types of data can be fused or joined in one or more data structures, etc., for purposes of model training, model implementation, etc. As shown in the example of FIG. 11, a join block 1111 can join various types of data and make such data available for purposes of training one or more machine learning models (ML models) per a train block 1112 (e.g., train and test, etc.) that can generate one or more ML models for lit flare and/or unlit flare determinations per a model block 1113. As shown, data from the join block 1111 can be utilized for purposes of making model-based evaluations per an evaluation block 1114, for example, to generate output as to lit flares and/or unlit flares. In such an example, output of the evaluation block 1114 may be utilized by an alert block 1116 for generation and/or issuance of one or more alerts. As an example, the alert block 1116 may provide for issuance of one or more instructions, which may be or include control instructions suitable for equipment control at one or more facilities to improve and/or reduce flaring.

As explained, the system 1100 can include features for evaluation of regional flare metrics, continuous and/or intermittent behaviors, flare presence or absence, etc.; can include features for evaluation of methane mixing ratio signals; can include features for evaluation of flare classification; and can include features for evaluation of weather variables.

As explained with respect to the fusion and model evaluation 1110, evaluation output based on various data sources (e.g., satellites, etc.) can be joined where a machine learning model or models (ML model or ML models) can be trained using at least a portion of the joined evaluation output to generate a lit or unlit classification model that can be evaluated, for example, using a portion of the evaluation output (e.g., split into training data and test data). As an example, learning (e.g., training) may be performed in a supervised and/or unsupervised manner. For example, consider user input (e.g., a human in the loop) approach that can participate in training (e.g., via labeling, feedback, etc.). As shown, a trained ML model (or trained ML models) can be utilized to receive data, which may be evaluation outputs, to determine whether a flare is lit or unlit. In such an example, one or more signals may be issued to one or more systems, frameworks, user addresses, etc., as to status of a flare or flares. As explained, such an approach may be part of a computational environment that aims to provide for monitoring methane and/or taking one or more control actions related to methane (e.g., production, abatement, etc.). For example, consider a signal or signals directed to equipment (see, e.g., FIGS. 1, 2, 3, 4, etc.) where equipment operations may be controlled. As explained, data from one or more sites such as local data may be available for use in one or more workflows, systems, etc.

As explained, operators can benefit from a cost-effective system that can monitor flares in a relatively continuous manner, identify when flares have gone out, detect unusual atmospheric methane concentrations and alert when issues are found so corrective actions can be triggered.

As explained, there are a few public satellites that go around the Earth in polar orbits circling the Earth every 90 minutes. This means various public satellites can cover the whole surface of the earth approximately every 24 hours.

During night-time, the VIIRS sensor, which exists on the NOAA-20 satellite, can be used for detecting and characterizing combustion sources. During daytime, the TRO-POMI sensor, which is onboard on the Sentinel 5P Precursor satellite, from the European Space Agency using a short-wave infrared radiation sensor can measure methane concentrations on columns with a base area of 7×3.5 km$^2$. The Sentinel 3 satellite with the Sea and Land Surface Temperature Radiometer (SLSTR) instrument from the European Space Agency may also be used to measure gas flares and give confidence to the VIIRS sensor.

There are also constellations of earth-imaging satellites that capture images with resolutions from 50 cm to a few meters that can also be used to monitor and confirm flare conditions.

If weather data are incorporated into a system, then various emission sources may be located using such weather data, for example, by analyzing plume sources, plume shapes and wind conditions (speed and direction). As an example, where satellite imagery (e.g., day time and/or night time) varies with respect to flyover times in terms of images and regions imaged (e.g., where a region or portion thereof may be in a different image frame over multiple flyover passes of a satellite), a method can include utilizing a trained machine learning model to identify sites in one or more images for a region imaged. In such an example, pattern-based identification (e.g., pattern recognition) may be utilized where lit flares can define a pattern, which may change over time due to a change in status of a flare (e.g., from lit to unlit), addition of one or more lit flares, etc. In such an example, weather data may be utilized that may provide indications of expected plume directions from flares in a region of interest. For example, consider a method that determines that weather conditions are similar for temporal images such that a plume pattern approach can be utilized for identification and/or classification of flares (e.g., as lit or unlit).

As an example, a workflow for the automatic detection of unlit flares can utilize data from one or more satellites. In such an example, a workflow can perform detection based on one or more changes in data of a satellite(s) capable of detecting flares with the VIIRS sensor or the SLSTR instrument within a time frame and area of interest.

As an example, one or more data science techniques can be utilized to classify flares as continuous or intermittent and, for example, remove false positives from intermittent flares. For example, consider using one or more features of the DATAIKU DSS, which includes: univariate analysis, bivariate analysis, distribution and curve fitting, and correlation matrices as descriptive statistics; techniques for analyzing populations (e.g. using hypothesis testing, etc.) as inferential statistics; dimensionality reduction (e.g., principal component analysis (PCA)); and various machine learning techniques (e.g., prediction using supervised machine learning, clustering using unsupervised machine learning, automated machine learning, etc.). The DATAIKU DSS also includes computer vision techniques, including PYTORCH framework-based computer vision for training and deploying models on cloud-enabled dynamic GPU clusters. The PYTORCH framework is an open source AI framework (Facebook AI Research Lab (FAIR), Facebook, Inc., Menlo Park, California).

As an example, one or more data science techniques such as machine learning can be utilized to classify flares as lit or unlit, for example, with a confidence metric.

As an example, geospatial data fusion can be utilized to increase confidence of detection, for example, by using complementary measurements (e.g., consider one or more of VIIRS sensor data, TROPOMI sensor data, satellite imagery, Sentinel 3 SLSTR instrument data or one or more other types of relevant data available on the area of interest). As an example, a method can include cleaning and/or validating raw and/or processed satellite data using data from one or more other satellites. For example, consider utilizing data such as Sentinel 3 fire radiative power (FRP) data product data for purposes of cleaning and/or validating. The Sentinel 3 FRP data product utilizes the S7 and F1 thermal channels mainly for land fires and the S6 shortwave IR channel mainly for detecting gas flares. The Sentinel 3 FRP processing can include a global fire detection process (e.g., based on spatial and spectral thresholding tests, pixels potentially associated to a fire can be identified); a fire confirmation process (e.g., for each fire pixel selected, actual presence of a fire is confirmed using statistical information regarding a background window and comparing statistics to a potential fire); and a fire characterization process (e.g., when a fire is confirmed, a series of fire properties are calculated such as FRP, uncertainty, confidence, classification, etc.).

As an example, false positive removal may occur by filtering input data, for example, using cloud coverage satellite images.

As an example, false positive reduction may occur by combining weather data with one or more other data sources such as, for example, atmospheric column methane measurements, flare data, and satellite imagery.

As an example, a method can include detecting the source of emissions by combining weather data with one or more other data sources such as, for example, atmospheric column methane measurements, flare data and satellite imagery.

As an example, a method can include false positive removal (e.g., reduction) by correcting for spatial jittering in satellite geospatial data sources.

As an example, a workflow can include issuing one or more alerts, signals, graphics for rendering, etc., for example, to alert a user or users of unlit flares in their areas of interest. As explained, an unlit flare can be an indication of methane emissions into the atmosphere.

As explained, a workflow may operate in a relatively continuous manner, for example, to train a lit or an unlit detection model, which may include human in the loop (e.g., human feedback).

As an example, a method can include receiving a list of locations for monitoring, analysis, control, etc., receiving geospatial data from various different sources, and detecting an unlit flare candidate and optionally assessing confidence of the detection via additional data and/or assessing temporal aspects such as whether the unlit flare is an intermittent flare (e.g., alternating between a lit state and an unlit state). In such an example, a trained ML model may be utilized for detection of a lit flare, an unlit flare, temporal aspects of a flare, etc. For example, consider a trained ML model that can receive data (e.g., raw and/or processed data) that can include and/or be based on spatial data and optionally temporal data and output classifications, optionally with one or more metrics (e.g., confidence, probability, etc.). In such an approach, classifications can include one or more of lit, unlit, intermittently lit and continuously lit.

As explained, output of a trained ML model (e.g., or trained ML models) with lit or unlit classification and confidence may be assessed for purposes of issuing one or more instructions (e.g., alert, control, etc.). Such an approach can include issuance of one or more instructions to one or more addresses (e.g., for machines, individuals, entities, etc.) such as, for example, one or more of email, SMS, push notifications on mobile apps, etc.

As an example, a framework may provide for reception of feedback. For example, consider feedback from field equipment, feedback from individuals (e.g., onsite, offsite, etc.), etc. As an example, feedback may be utilized to improve one or more processes such as, for example, to improve training, re-training, etc., of a ML model, to improve control to reduce and/or improve flaring, etc.

As an example, a method can include receiving a GeoJSON file (e.g., a format for encoding a variety of geographic data structures), a shape file, etc., that defines a region or facility. As an example, consider a GUI in the DELFI environment that allows a user to visualize a region and to mark a region for monitoring, analysis and/or control. As explained one or more frameworks such as the PETREL framework, the VISAGE framework, the PIPESIM framework, etc., may be utilized to understand, control, simulate, etc., operations regarding one or more types of gases (e.g., $CO_2$, methane, etc.). As an example, the DELFI environment may be accessible as a data source. For example, consider accessing location data, operational data, etc., from the DELFI environment or associated framework(s), which may provide for locating, assessing, classifying, etc., various flares.

As explained, geospatial data may be acquired from various different sources such as satellites, weather stations, etc. for ingestion and processing in a cloud platform environment. For example, consider one or more of the following different geospatial sources and processing techniques: satellite sources capable of detecting flares such as the NOAA-20 and/or the Suomi-NPP with the VIIRS sensor (e.g., data during night-time flyovers, etc.); filtering of weather obscured regions (e.g., cloudy regions, etc.) to reduce instances of false positives; differentially comparing images from different times (e.g., previous days, etc.) to determine whether a flare is unlit in a region defined by an AOI/ROI (e.g., via finding exceptions, etc.); detecting changes of a flare during a flyover and no flare or a substantially weaker flare during a later flyover (e.g., accounting for imaging conditions such as weather, etc., during multiple flyovers in an AOI/ROI); assessing historical data for a baseline (e.g., whether flares may be usually lit, etc.) for comparisons such that, where a meaningful deviation is observed, a flare can be flagged as a candidate unlit flare; anti-jitter processing of satellite data (e.g., VIIRS sensor data, etc.) where such data are prone to spatial jittering where the coordinate locations attributed to measured values may be inconsistent across multiple flyovers with respect to time; processing utilizing one or more data science techniques such as, for example, density based clustering over a time window may be used to adjust for spatial jittering and to map consistent points to a fixed location over time; satellite data of atmospheric methane measurements (e.g., methane mixing ratio) as may be acquired from the Sentinel 5P Precursor with the TROPOMI sensor, which may be utilized to corroborate classifications as to lit flares and/or unlit flares, for example, by looking at quantitative and/or qualitative changes on atmospheric methane measurements (e.g., methane mixing ratio) within a time period and region (e.g., for Sentinel 5P with TRO-POMI, when a flare is unlit, the methane mixing ratio will increase and it is expected that Sentinel 5P with TROPOMI will detect it on a subsequent flyover where such an approach to corroboration can be useful for larger flares, because smaller flares may not generate sufficient methane emission as to be detectable by the Sentinel 5P with TRO-POMI; noting that, as sensitivity of satellite sensors increase, such corroboration can be improved); acquisition of additional satellite data capable of use in flare detection (e.g., Sentinel 3 with the SLSTR instrument to aid in validation of other measurements from one or more other satellites used for flare detection such as NOAA-20 with the VIIRS sensor), which may be utilized in a ML model for lit flare and/or unlit flare detection (e.g., as classifications) where, for example, a gas flare may be detected via source data from a secondary source within a region and timeframe of a lit flare detected via source data from a primary source within the region and the timeframe (e.g., to increase confidence of lit and/or unlit ML model(s) evaluation); identification of changes in an AOI/ROI that can be attributed to an unlit flare where such an approach can be performed using relatively low-resolution images captured once or a few times per day and/or by triggering a high-resolution capture that may be available in a matter of hours (e.g., a couple of hours, etc.) where one or more ML techniques (e.g., computer vision techniques, etc.) can be used to train an image classification neural network to classify between lit and unlit flare satellite imagery; weather data sources that can provide information such as, for example, wind speed, wind direction and cloud cover, which may be utilized to adjust processing and/or increase confidence of one or more other geospatial measurements (e.g., methane atmospheric readings from the Sentinel 5P Precursor with the TROPOMI sensor), where one or more ML models may be utilized, optionally depending on size of emission, to receive weather data and output indicators as to confirmation of a source of emission and/or to distinguish between different emission sources.

As explained, when an unlit flare candidate is detected then additional data may be used to increase the confidence of the detection. In such an example, further processing on ingested geospatial data from different sources with data science techniques may be performed to help infer data insights to assist with validation of one or more ML models (e.g., for lit and/or unlit detections). As an example, processing can include implementation of one or more statistical techniques, for example, to identify intermittent flares and continuous flares. As explained, an intermittent flare may be defined as one which is designed to alternate rapidly between lit and unlit or otherwise alternate between lit and unlit states; whereas, continuous flares can be defined as flares that are not designed to alternate rapidly between lit and unlit states. As an example, operational data and/or control data for a local site may experience changes (e.g., due to conditions, regulations, etc.), where such changes may provide indications as to intent and/or expectations of flare behavior. As an example, in various instances safety and/or labor regulations may call for lighting and/or extinguishing and/or producing gas and/or not producing gas (e.g., consider weather, holidays, religious periods, etc.).

As explained, various types of data may be used in a ML model to evaluate lit and/or unlit flare detection. For example, consider a ML model that outputs a classification for lit or unlit flare detection with a confidence based on the input parameters to the ML model.

As explained, output of a ML model (e.g., as to lit or unlit classification and confidence) may result in an alert being issued to operators concerned with a facility or a region evaluated by the ML model. As an example, various thresholds may be used to evaluate when an alert is to be triggered where, responsive to triggering, a system can access a configuration file, address file, etc., for issuance of an alert via email, SMS, push notifications on mobile apps, etc. As explained, machines and/or individuals may provide feedback based on outcome of an alert or lack thereof, which may be used to improve accuracy of one or more data science techniques, for example, in evaluating lit or unlit flares.

Figure 12:
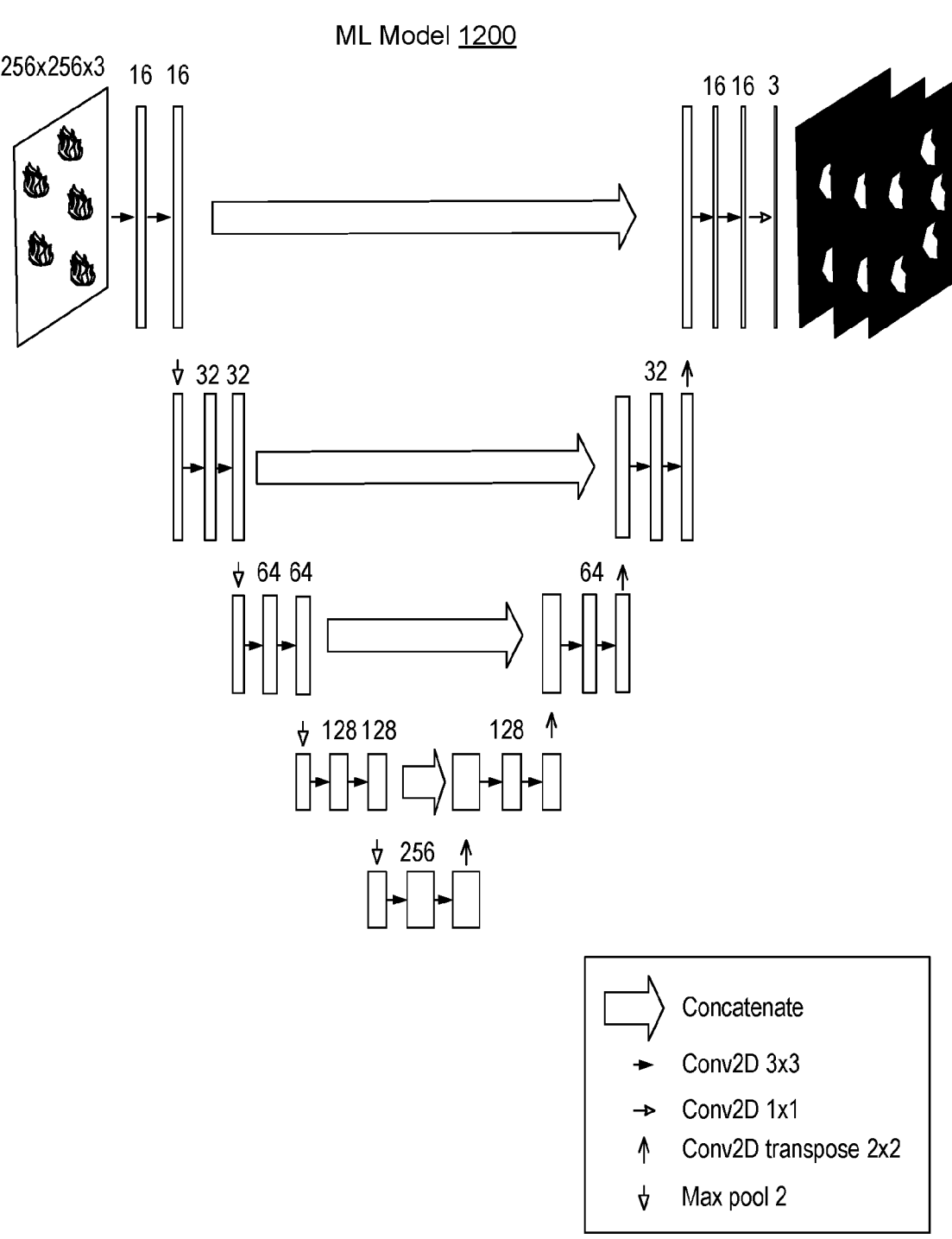
FIG. 12 is a diagram of an example of a machine learning model.

FIG. 12 shows an example of a ML model 1200 that can be a convolutional neural network (CNN) trained and utilized to analyze satellite and/or other data.

As an example, a deep learning approach can utilize one or more convolutional neural networks (CNNs) for segmentation of a frame or frames into various categories (e.g., various masks). Segmentation via a CNN can provide for pixel-wise classification such that a pixel of a frame is identified as being part of a class (e.g., flame, smoke or water screen(s)). In such an approach, one or more trained CNNs can provide, for each frame of imagery, a probability map for each of a plurality of different object types (e.g., a flame object type, a smoke object type, etc.). As explained, the output of a trained CNN can be a plurality of masks that provide, probabilistically, indications of a pixel belonging to a corresponding object type of a plurality of object types.

In the example of FIG. 12, the ML model 1200 includes a U-shaped architecture and may be referred to as a U-Net architecture. In the example of FIG. 12, various numbers are given for illustration of an embodiment; noting that such numbers can depend on one or more factors such as, for example, image frame data matrix size, etc. Specifically, in the example of FIG. 12, an input image or a portion of a larger image (e.g., image frame data) is shown as being 256×256 where operations are performed for 16 channels. As shown, the number of channels increases down the left leg of the U-shaped architecture and decreases up the right leg of the U-shaped architecture.

The ML model 1200 includes a U-Net architecture where max pooling operations are performed at transitions for four layers, starting from an upper layer, to reach a base layer of the U-Net architecture and where multi-dimensional 2×2 transpose convolution operations are performed at transitions for the four layers, starting from the base layer, to return to the upper layer.

In the example ML model 1200, the first four layers involve concatenation across legs of the U-shaped architecture. At each of the five layers, for both legs of the U-shaped architecture as well as the base layer, multi-dimensional 3×3 convolutions are performed. Additionally, to output one or more classes (e.g., one or more masks, etc.), the ML model 1200 includes a 1×1 convolution. In the ML model 1200, skip connections act to improve accuracy compared to models like a fully convolutional neural network (FCN) without skip connections.

In the example ML model 1200, for a 256×256 RGB image (e.g., 256×256×3), the ML model 1200 can be a thin U-Net model with approximately 1.9 million weights. Training can utilize "ground truth" labeled pixel arrays for purposes of determining suitable values for the weights.

In the example ML model 1200, the output from the expansive path can be an array that is, for a 256×256 input image, a 256×256×N array (e.g., a matrix), where N represents the number of classes, which can, for example, include one or more of a flame class, a smoke class, etc. In such an example, a combination of flame and smoke may be utilized to determine whether or not a flare is lit or unlit. In such an approach, the array can include probability values for each element (e.g., pixel) that may range, for example, from zero (not a member of a class) to unity (a member of a class). Such an array can be processed to generate binary masks, for example, consider using one or more thresholds to transform elements above a threshold to unity (1) and elements below the threshold to zero (0). A plurality of binary masks may be applied to an input image to segment the input image into classes where a rule can be applied such that each pixel in the input image is assigned to an appropriate class via application of the binary masks (e.g., including a background class, which may include pixels that are not segmented into one or more other classes).

As an example, a binary mask can be a probabilistic mask, for example, with zeros (0) to indicate, probabilistically, "not a flame", "not smoke", etc., and with ones (1) to indicate, probabilistically, "a flame", "smoke", etc., which, as explained, may be utilized to determine (e.g., night and/or day) whether a flare is lit or unlit. While smoke is mentioned, smoke may be associated with a plume such that a trained ML model can make determinations as to presence or absence of plumes and/or plume characteristics (e.g., size, shape, direction, etc.). As mentioned, data such as methane data can be available from a satellite where a trained ML model can make determinations as to presence or absence of indications of methane and/or characteristics thereof (e.g., consider size, shape, direction, etc., of a methane plume). As explained, weather data may be considered where factors such as wind may physically influence flaring operations and/or observable data (e.g., plumes, etc.).

As an example, consider a U-Net architecture as described in an article by Ronneberger et al., "U-Net: Convolutional Networks for Biomedical Image Segmentation," arXiv: 1505.04597 (2015), which is incorporated herein by reference in its entirety. Such an architecture includes a contracting path (see the left side of the ML model 1200) and an expansive path (see the right side of the ML model 1200). The article by Ronneberger et al. describes a contracting path that follows an architecture of a convolutional network (e.g., a CNN) and that includes repeated application of convolutions and use of a rectified linear unit (ReLU) along with a max pooling operation with a specified stride for downsampling where, in an expansive path, upsampling of a feature map can be performed followed by convolution.

Specifically, Ronneberger et al. describe a network architecture that includes a contracting path (left side) and an expansive path (right side) where the contracting path follows an architecture type of a convolutional network and includes repeated applications of two 3×3 convolutions (unpadded convolutions), each followed by a rectified linear unit (ReLU) and a 2×2 max pooling operation with stride 2 for downsampling. At each downsampling step, the number of feature channels is doubled. In Ronneberger et al., each step in the expansive path includes an upsampling of the feature map followed by a 2×2 convolution ("\up-convolution") that halves the number of feature channels, a concatenation with the correspondingly cropped feature map from the contracting path, and two 3×3 convolutions, each followed by a ReLU. The cropping handles loss of border pixels in each convolution. At the final layer a 1×1 convolution is used to map each 64-component feature vector to the desired number of classes. In total, the network of Ronneberger et al. includes 23 convolutional layers.

As to training, consider an approach of Ronneberger et al., where input images and their corresponding segmentation maps are used to train the network with the stochastic gradient descent implementation of the CAFFE framework. Due to the unpadded convolutions, the output image is smaller than the input by a constant border width. To minimize the overhead and make maximum use of GPU memory, Ronneberger et al. favored large input tiles over a large batch size and hence reduced the batch to a single image where a high momentum (0.99) was utilized such that a large number of the previously seen training samples determined the update in a current optimization step. As explained, one or more other approaches may be utilized for purposes of training, which may train the same type of ML model or one or more other types of ML models.

The example ML model 1200 of FIG. 12 can be utilized for mask generation, for example, to generate one or more masks from image data that can segment the image data, which may be in a raw format, a transformed format, a processed format, etc. As an example, one or more other types of ML models may be utilized to process data that include satellite data for purposes of flare monitoring, flare control, etc.

As an example, a system may utilize one or more recurrent neural networks (RNNs). One type of RNN is referred to as long short-term memory (LSTM), which can be a unit or component (e.g., of one or more units) that can be in a layer or layers. A LSTM component can be a type of artificial neural network (ANN) designed to recognize patterns in sequences of data, such as time series data. When provided with time series data, LSTMs take time and sequence into account such that an LSTM can include a temporal dimension. For example, consider utilization of one or more RNNs for processing spatial and temporal data from one or more sources. In such an example, patterns such as flare on and/or off patterns may be recognized in such data, which may provide a basis for determining when a flare is not behaving (e.g., operating) according to a pattern. Such a determination may take into account one or more other sources of data and/or types of data. For example, consider weather data and/or operational data, which may provide for indications of obscured raw imagery, a change in an operational schedule, etc. As an example, data can be input to a trained RNN where the trained RNN can output a prediction such as, for example, a prediction as to whether a flare is expected to be lit or unlit. Such output can be utilized for flare classification, for example, to classify a flare and/or to increase confidence or otherwise assess output of one or more other models. As an example, a trained RNN may output a pattern for a region of interest as a predicted pattern for a particular time or series of time where the pattern can indicate flare status of one or more flares. As an example, output from a trained RNN may be combined with one or more other types of data, for example, to increase confidence and/or provide for retraining of the RNN and/or training and/or retraining of one or more other types of ML models.

As an example, a trained ML model can be or include a decision tree structure. For example, decision tree learning or induction of decision trees can be utilized for predictive modelling where a decision tree (as a predictive model) can receive input (e.g., observations about an item represented in tree branches) to generate output (e.g., conclusions about the item's target value represented in the leaves). A decision tree model where the target variable can take a discrete set of values can be referred to as a classification tree where leaves can represent class labels and branches represent conjunctions of features that lead to those class labels. A decision tree where the target variable can take continuous values (e.g., real numbers) can be a regression tree. As an example, one or more types of decision trees may be utilized to detect unlit flares. For example, consider a decision flow that determines if a first characteristic of a flare is detected (e.g., visual imagery), if a second characteristic over a flare such as cloud cover is detected (e.g., indicative of a reason why a flare may not be detected), and if a third characteristic of a flare is detected (e.g., methane emissions indicative of an unlit flare). In such an example, if the first characteristic indicates an unlit flare, the second characteristic indicates lack of cloud cover, and the third characteristic indicates methane emissions (e.g., at the location of the flare), then the flare can be classified as being unlit with a relatively high level of confidence based on the given data.

As explained, a data source such as a TROPOMI sensor data source can provide data indicative of methane. As an example, a method can include determining that data from one or more sources as to a particular region indicate less flaring than usual (e.g., temporal pattern, etc.) and more methane than usual such that a conclusion can be made that a flare is not lit or otherwise not working properly and emitting methane. Such a method may be implemented using one or more types of ML models, which may perform various tasks (e.g., image recognition, temporal analysis, decision making, classification, prediction, etc.).

As to types of flares that can be assessed, consider production flares that may run for years at a time, well testing flares, rigsite flares, etc. As an example, a method can include classifying one or more flares at one or more sites into one or more classes, along with status such as lit or unlit. As an example, a method may operate to classify a single site in a region of interest or may operate to classify multiple sites in a region of interest. At oil and gas extraction sites, gas flares can be utilized for a variety of purposes such as one or more of startup, maintenance, testing, safety, and emergency purposes noting that production flaring at a site may be used to dispose of amounts of unwanted associated gas, possibly throughout the life of a well. Gas flares as utilized in one or more industries may be assessed and, for example, classified. A gas flare may be known as a flare stack, a flare boom, a ground flare, or a flare pit where gas combustion equipment of an industrial plant (e.g., a petroleum refinery, a chemical plant, a natural gas processing plant, etc.) controls the gas flare through a gas flaring process. As explained, different types of gas flares can exhibit different characteristics, which may pertain to size, emissions, efficiency, scheduling, etc. As an example, a method can include assessing one or more types of gas flares as to their characteristics, which may provide for determinations as to intended behavior, unintended behavior, etc.

As to types of machine learning models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, the TENSORFLOW framework (Google LLC, Mountain View, California) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As mentioned, a framework such as the PYTORCH framework may be utilized.

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms.

TENSORFLOW computations can be expressed as stateful dataflow graphs; noting that the name TENSORFLOW derives from the operations that such neural networks perform on multidimensional data arrays. Such arrays can be referred to as "tensors".

FIG. 13 shows an architecture 1300 of a framework such as the TENSORFLOW framework. As shown, the architecture 1300 includes various features. As an example, in the terminology of the architecture 1300, a client can define a computation as a dataflow graph and, for example, can initiate graph execution using a session. As an example, a distributed master can prune a specific subgraph from the graph, as defined by the arguments to "Session.run( )"; partition the subgraph into multiple pieces that run in different processes and devices; distributes the graph pieces to worker services; and initiate graph piece execution by worker services. As to worker services (e.g., one per task), as an example, they may schedule the execution of graph operations using kernel implementations appropriate to hardware available (CPUs, GPUs, etc.) and, for example, send and receive operation results to and from other worker services. As to kernel implementations, these may, for example, perform computations for individual graph operations.

FIG. 13 also shows some examples of types of machine learning models 1310, 1320, 1330, and 1340, one or more of which may be utilized. As explained, a ML model-based approach can include receiving image data that can be spatial image data. As an example, time can be a dimension such that image data can be spatial and temporal. As an example, a convolution neural network and/or one or more other types of neural networks can be utilized for spatial and/or spatial-temporal image analysis.

As an example, a ML model can address video (spatial-temporal image data) as sequences of short (e.g., N-frame) clips (e.g., consider N being greater than one and less than approximately 100). In such an approach, various aspects of changes with respect to time may be related to one or more types of physical phenomena associated with flaring hydrocarbons, which, once analyzed, can be utilized for burner control. In such an example, framerate (e.g., frames per second, frames per revolution around the Earth, etc.) and number of frames in a sequence (e.g., a series) may cover a desired amount of time, which can be for tracking dynamic behavior of one or more burner operations. As an example, analyses may be performed using different sequences, using different number of frames, using different framerates, using different processing techniques as to raw frame data, using different frame resolutions, etc. Such variables may be tailored to provide for processing efficiency, which may help to provide for real-time monitoring, analysis, control, etc.

As an example, a system may monitor, analyze, control, etc., one or more operations in a basin region such as, for example, an onshore and/or an offshore region. For example, consider the Permian Basin, where gas production can exceed pipeline capacity exiting the Permian Basin region, which may result in increased flaring. The Permian Basin is predominantly a shale oil play and has large quantities of associated gas production. Permian crude and natural gas liquids (NGL) production are expected to grow from 3.3 MMb/d in 2017 to 8.8 MMb/d by 2025, which in turn is expected to cause natural gas production to rise from 7.1 to 16.0 bcfd over the same time frame.

As an example, a system can include receiving various types of data associated with a basin, which may include traffic data for transport of oil and/or gas and/or water. For example, transport of oil can indicate production from a site where gas production may occur, where gas may be flared, stored, etc. As an example, trucks and/or pipelines may be utilized for transport of gas. Where trucks are utilized, one or more types of data as to movement of trucks may be utilized in an analysis of gas. Where trucks are utilized for oil transport, if a storage facility is full before arrival of a truck, then production may be halted, which may halt gas production, which, in turn, may halt flaring. Such a halt may be associated with halting production of gas and hence not contribute to emissions of methane as in an unlit flare situation. Thus, using various types of data, an unlit flare can be determined to be due to lack of methane emissions or due to methane emissions not being burned via flaring.

Data on flaring and venting volumes have been collected from producers by some producing state agencies, who then share the data with the U.S. Energy Information Administration (EIA). Per an EIA Natural Gas Flaring and Venting report of June 2019, data compiled by EIA show that the reported volumes of gas flared reached levels of between 225 and 285 bcf per year in the mid-1990s. After dropping to less than half that during the early 2000s, reported flared volumes have again risen to levels between about 200 and about 300 bcf per year during the 2011-2017 time period as both oil and natural gas production levels have increased significantly.

As explained in a June 2019 U.S. Department of Energy report (Natural Gas Flaring and Venting: State and Federal Regulatory Overview, Trends and Impacts), which is incorporated herein by reference in its entirety, the flaring limits vary from state to state and no national standards currently exists. The DOE has developed a series of individual state fact sheets that summarize the flaring and venting regulations applicable in each of 32 oil- and gas-producing states and provide context and contact information for interested stakeholders.

Figure 14:
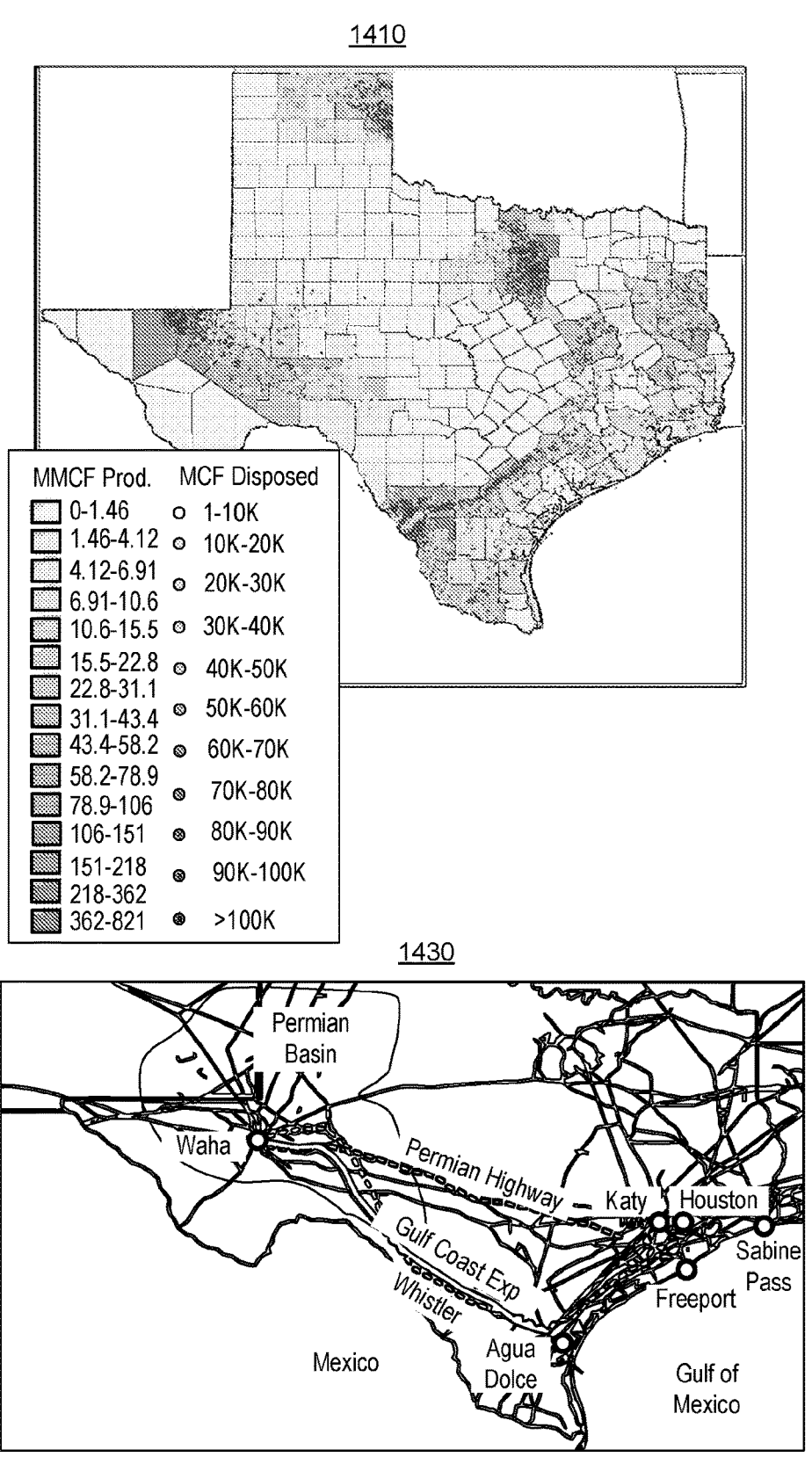
FIG. 14 is a series of graphics of examples of gas production in a region.

FIG. 14 shows a map 1410 with associated data from the DOE report, which highlights various shortcomings of particular satellite-based analyses. With various caveats, the DOE report states that approximately 90,000 flares in 2017 were sorted by county and it was determined from this data set that:

A. Of the 254 counties in Texas, 200 have permitted flares operating.
B. In 2017, there were roughly 97,000 flares in Texas.
C. Within the 22 counties that make up the Permian Basin, there were about 6,000 flares, which accounted for about 12% of the gas flared in 2017.
D. The 26 counties that encompass the Eagle Ford play had 15,423 flares and accounted for 35% of the gas flared in 2017.
E. The other 19 counties across the state having more than 1000 flares each, accounted for a total of 47,553 flares and nearly 40% of the gas flared in 2017.

Specifically, the map 1410 shows flares located relative to the gas production volumes for individual counties across the state. A large number of larger flares are located in the western Permian Basin play, along the Eagle Ford play in south central Texas, across the Barnett shale play in the Fort Worth Basin, and where the western portion of the Anadarko Basin extends into the Texas Panhandle. In the map 1410, Texas Railroad Commission (TRRC) data show locations of flares and volume of gas flared during 2017, which is indicated by color; darker red means larger flare. The volume of gas produced, by county, is indicated by color also; darker brown means higher production volume.

FIG. 14 also shows a map 1430 that includes various natural gas features as associated with the Permian Basin, which includes pipeline transportation routes. As an example, gas may be liquefied for transport as, for example, liquid natural gas (LNG), which may be via pipeline, truck, train, etc. As an example, a method can include receiving data as to liquefaction such as, for example, a permanent and/or mobile liquefaction technology, site, etc. For example, consider CRYOBOX technology (Galileo Technologies S.A., Sáenz Peña, Argentina), a mobile liquefaction unit deliverable by trailer where a CRYOBOX unit can begin production within hours and can convert 1 million BTU of gas per day resulting in up to approximately 10,000 gallons of LNG per day.

The DOE report states that the large number of flares identified in the TRRC data set seemed inordinately high in comparison to the number of Texas flares identified by the NOAA satellite survey (~2,000 versus ~100,000). The DOE report speculated that it is reasonable to suspect that only the larger flares are detected by satellite and many smaller flares are invisible to that approach. The DOE report also speculated that many of the permitted flares, especially the smaller volume flares, are ephemeral; for example, a flare permitted for a drilling operation in a specific well that is only used infrequently over a several week period over a year.

As explained, a system that utilizes machine learning on satellite data and optionally one or more other types of data can provide for a more accurate assessment of flaring activity, including lit and unlit flaring and, for example, one or more behaviors that may be associated with one or more underlying reasons for a flare being lit or not lit (e.g., whether methane is being emitted or not, etc.).

As an example, a system may detect conditions associated with power grid operations such as conditions related to climate events. For example, an article by Chapa, "Enviros: Winter storm resulted in massive amounts of flaring in Permian Basin" in the Houston Chronicle (Feb. 10, 2020, Updated: Feb. 10, 2020 7:44 p.m., https://www.chron.com/business/energy/article/Enviros-Winter-storm-resulted-in-massive-amounts-15039446.php) is incorporated herein by reference in its entirety, stated:

A winter storm that brought snow to large areas of West Texas resulted in massive amounts of flaring in Permian Basin after several natural gas processing plant were shut down by multiple power failures, environmentalists said. The winter storm that blanketed Midland and much of the Permian Basin in snow on February 4 and 5 is being blamed on the release of 8.8 million pounds of air pollution in 33 separate incidents, figures from the Austin environmental group Environment Texas show. Oil and gas companies released a combined 39.5 million pounds of air pollution in the region during 2018, the environmental group reported—meaning that the two-day releases were equivalent to roughly one quarter of the air pollution released in the entire region in a single year.

Multiple air pollution reports filed with the Texas Commission on Environmental Quality blamed frozen components, extreme cold weather, freezing weather and icy conditions for knocking out natural gas processing plants and pipeline compressors throughout the region. Houston pipeline operator Targa Resources reported that its Driver Gas Plant in Midland County went down on February 5 after a breaker blew at a power station managed by the Dallas power line operator Oncor. Freezing conditions and heavy snow prompted Targa to route gas from the plant to other facilities, but other companies were not as lucky.

As an example, a system can provide for detecting increased flaring, which may be associated with power generation. In such an example, the system, as mentioned, can include reception of weather data, which may indicate that a demand in power may be expected (e.g., colder weather) and/or that electrical power generation may be impacted (e.g., closing of electrical power generation facilities). In such an example, a system may have predictive capabilities that can highlight awareness of possible changes in flaring behaviors. For example, consider the DELFI environment as having a flaring monitoring framework that can be highlighted when weather conditions may cause a change in flaring. In such an example, a GUI may be rendered to a display with a graphic or graphics to indicate flaring behaviors where a tally may be provided to show trends in flaring. For example, using a system that can detect lit and/or unlit flares, graphics may be generated along with trend data that can be rendered in combination with weather graphics and/or data. In such an example, power grid data may be included that can indicate one or more results of changes, which may help to verify (e.g., confirm, etc.) one or more trends.

As explained, a system may provide for detection of unlit flares and may provide for detection of lit flares where trends may be determined and related to one or more other types of conditions where one or more alerts, signals, etc., may be issued. As an example, where weather conditions indicate potential issues with the gas supply chain (e.g., closure of electrical power plants, etc.), one or more signals may be issued for purposes of control of gas production at one or more site. For example, consider shut down of production of gas (e.g., and/or oil) such that excessive flaring may be reduced.

As explained, a system can provide for implementation of one or more comprehensive workflows for detecting flaring or non-flaring activities, tracking historical VIIRS data, removing spatial jittering, and filtering out false events from poor imaging conditions, geospatial data fusion for detecting unlit flares, use of complementary satellite data for increasing confidence of detection, use of cloud coverage to avoid false positives, use of weather data for improving confidence of measurements, use of data science methods to correct for spatial jittering in satellite geospatial data sources, etc. As explained, a system may tie into activities related to a gas production and/or supply chain, which may be impacted by weather, etc. As explained, activities can include transport by vehicle of oil, water and/or gas, operations of one or more electrical power generation plants, etc. As to power outages, as an example, satellite data and/or other data may indicate where power is out (e.g., via lighting, etc.).

As explained, various issues can exist in NOAA satellite data flare detection where, as mentioned, such detection can be inaccurate and/or not provide for detection of temporal types of flaring operations. As an example, a system can provide for overcoming such shortcomings, for example, using enhanced, automatic detection of unlit flares from space. As explained, such a system can include machine learning using one or more types of machine learning models. As an example, a method can provide for more robust monitoring, optionally without having local site monitoring equipment at each of a plurality of sites. As explained, a system can provide for integration with one or more types of measurements to provide a holistic methane mitigation solution.

As an example, a system may include one or more features of the Kayrros Flaring Watch system, the GHGSat global emissions monitoring satellite sensor system, the Geosite Methane Detection system (e.g., a methane emissions detection basemap that updates weekly, giving the industry actionable imagery to detect high-emission events like an unlit flare or a major leak), Avanade and Microsoft detection system, etc.

As an example, a system can provide for monitoring flares at wellsites and production facilities to reduce their carbon footprint, comply with regulations, control site equipment, etc.

As an example, a system may receive one or more types of data that include satellite data. As an example, one or more types of data can include aircraft data (e.g., drone, plane, etc.) and/or land/sea vessel data.

As an example, data such as LANCE data can provide the AIRS Precipitation Estimate Day/Night layer which is an estimate of daily precipitation and the Advanced Microwave Scanning Radiometer 2 (AMSR2) surface rain over ocean. Precipitation is formed when water vapor condenses and becomes heavy enough to fall under the force of gravity. The characterization of precipitation over the ocean can be useful as, unlike on land, there can be limited ground/surface stations that measure precipitation in the vast expanses of ocean. Integrated Multi-satellitE Retrievals for GPM (IM-ERG) is another NRT precipitation product that may be used.

As an example, NOAA-20 satellite images may be utilized for one or more purposes. For example, such images show bright city lights across Texas before the storm on Jan. 31, 2021, and dimmer images during the storm and outages Feb. 16, 2021. Data from such images in one or more regions of interest (e.g., U.S. or other region(s)) may be analyzed temporally to provide indications of changes in energy distribution through night time illumination from homes, businesses, roadways, etc., which may be compared to images for flaring. In such an approach, associations may be made between weather, flaring and energy distribution (e.g., impact of a reduction in energy availability, energy distribution, etc.). The NOAA-20 satellite and the Suomi-NPP satellite are both environmental satellites that are part of the United States' Joint Polar Satellite System, which involves scientists from both NOAA and NASA. Both of these satellites include the VIIRS sensor and, therefore, can be sources of VIIRS sensor data. Various types of satellite data can also help predict severe weather, and provide data for forecasting (e.g., three to seven days ahead of a storm, etc.).

FIG. 15 shows an example of a method 1500 and an example of a system 1590. As shown, the method 1500 includes a reception block 1510 for receiving data that include satellite data of a region of interest that includes multiple hydrocarbon production sites that include gas flaring equipment; an identification block 1520 for identifying one or more unlit gas flares at one or more of the multiple hydrocarbon production sites using a trained machine learning model and at least a portion of the data, where the trained machine learning model is trained using at least spatial and temporal satellite data to classify gas flares in the region of interest; and an issuance block 1530 for, based at least in part on the identifying, issuing at least one instruction related to operation of the gas flaring equipment in the region of interest.

The method 1500 is shown as including various computer-readable storage medium (CRM) blocks 1511, 1521, and 1531 that can include processor-executable instructions that can instruct a computing system, which can be a control system, to perform one or more of the actions described with respect to the method 1500.

In the example of FIG. 15, the system 1590 includes one or more information storage devices 1591, one or more computers 1592, one or more networks 1595 and instructions 1596. As to the one or more computers 1592, each computer may include one or more processors (e.g., or processing cores) 1593 and a memory 1594 for storing the instructions 1596, for example, executable by at least one of the one or more processors 1593 (see, e.g., the blocks 1511, 1521 and 1531). As an example, a computer may include one or more network interfaces (e.g., wired or wireless), one or more graphics cards, a display interface (e.g., wired or wireless), etc.

As an example, the method 1500 may be a workflow that can be implemented using one or more frameworks that may be within a framework environment. As an example, the system 1590 can include local and/or remote resources. For example, consider a browser application executing on a client device as being a local resource with respect to a user of the browser application and a cloud-based computing device as being a remote resources with respect to the user. In such an example, the user may interact with the client device via the browser application where information is transmitted to the cloud-based computing device (or devices) and where information may be received in response and rendered to a display operatively coupled to the client device (e.g., via services, APIs, etc.).

FIG. 16 shows an example of a method 1600 that includes a reception block 1610 for receiving data that include satellite data of a region that includes multiple sites; a train block 1620 for training a machine learning model using the data to generate a trained machine learning model; a reception block 1630 for receiving additional data; and an identification block 1640 for identifying one or more unlit flares at one or more of the multiple sites using the trained machine learning model and at least a portion of the additional data. In such an example, training can include supervised training and/or unsupervised training using the data where training can include partitioning the data into a training data set and a testing data set. Training can include determining values of parameters of the machine learning model. For example, consider training that determines weights in an artificial neural network, that determines support vectors in a support vector machine, that determines coefficients in a linear regression or logistic regression, etc. As an example, a method can include optimizing training of a machine learning model by selecting and/or adjusting hyperparameters. For example, consider optimizing a learning rate for training a neural network via hyperparameter selection and/or adjustment, optimizing hyperparameter C and sigma values for a support vector machine, optimizing a hyperparameter k-value in k-nearest neighbors model (KNN model), etc.

The method 1600 is shown as including various computer-readable storage medium (CRM) blocks 1611, 1621, 1631 and 1641 that can include processor-executable instructions that can instruct a computing system, which can be a control system, to perform one or more of the actions described with respect to the method 1600.

As an example, a method can include receiving data that include satellite data of a region of interest that includes multiple hydrocarbon production sites that include gas flaring equipment; identifying one or more unlit gas flares at one or more of the multiple hydrocarbon production sites using a trained machine learning model and at least a portion of the data, where the trained machine learning model is trained using at least spatial and temporal satellite data to classify gas flares in the region of interest; and, based at least in part on the identifying, issuing at least one instruction related to operation of the gas flaring equipment in the region of interest. In such an example, the data can include data other than satellite data. For example, consider receiving data pertaining to operations at a site (e.g., a site plan, a site schedule, etc.), regulatory data (e.g., as to operational conditions, times, etc.), etc.

As an example, a method can include receiving weather data for the region of interest. For example, consider processing at least a portion of satellite data pertaining to flaring in a region of interest using weather data for a region of interest. In such an example, a method can include filtering based on atmospheric conditions indicated by the weather data for the region of interest for reducing false identification of an unlit gas flare state at one or more of the multiple hydrocarbon production sites. For example, clouds may block an ability of a satellite sensor from sensing a site or sites such that sensed data appears to indicate that a lit flare does not exist at the site.

As an example, a method can include identifying a lit gas flare; and classifying the lit gas flare as an intermittent gas flare or a continuous gas flare using a trained machine learning model.

As an example, a method can include comparing one or more unlit gas flares to historic data for the one or more unlit gas flares to determine one or more occurrences of a change from a lit state to an unlit state (e.g., a lit status to an unlit status). As an example, a method can include determining one or more occurrences of a change from an unlit state to a lit state (e.g., an unlit status to a lit status).

As an example, a method can include receiving data that include satellite data of a region of interest that includes multiple hydrocarbon production sites that include gas flaring equipment; identifying one or more unlit gas flares at one or more of the multiple hydrocarbon production sites using a trained machine learning model and at least a portion of the data, where the trained machine learning model is trained using at least spatial and temporal satellite data to classify gas flares in the region of interest; and, based at least in part on the identifying, issuing at least one instruction related to operation of the gas flaring equipment in the region of interest, where the performing receiving, the identifying, and the issuing are performed automatically without manual intervention. For example, consider a computing system that can perform such a method in an automated manner as data are acquired over time (e.g., intervals of days, weeks, etc.).

As an example, a trained machine learning model can be or include a convolution neural network.

As an example, a method can include identifying one or more unlit gas flares by utilizing location data of previously lit flares. For example, consider using temporal data where locations are identified in the temporal data and analyzed to determine if a change has occurred at a location from a lit flare to an unlit flare.

As an example, a method can include receiving data from a plurality of different satellites. In such an example, the satellites can include one or more satellites with a sensor that can generate imagery pertaining to flaring and can include one or more satellites with a sensor that can generate imagery pertaining to weather.

As an example, a method can include estimating methane emissions at one or more of multiple hydrocarbon production sites.

As an example, a method can include receiving data that include night time data and day time data. For example, consider data from a flyover of a satellite during day time for a region of interest and data from a flyover of the same satellite or a different satellite during night time for the region of interest. In such an example, different activities may be discerned in the day time and night time data. As explained, flares may be more visible in night time satellite imagery.

As an example, a method can include determining a reason for an unlit flare being unlit at one of multiple hydrocarbon production sites. For example, consider making such a determination using weather data, regulatory data, operational data, etc. As to weather data, consider a shutdown of a site due to wind (e.g., hurricane, tornado, etc.). As to regulatory data, consider a shutdown due to a holiday or regulated production issue. As to operational data, consider a shutdown according to an operational schedule (e.g., for equipment maintenance, inspection, etc.).

As an example, a method can include receiving data that include transportation data and detecting a change in gas transportation based on the transportation data. For example, consider detecting a change in gas tanker truck traffic (e.g., into, in, or out of the Permian Basin, etc.), a change in gas tanker ship traffic (e.g., into or out of a gas tanker ship port, etc.). As an example, where gas tanker trucks are limiting, more gas may be flared, particularly where a pipeline or pipelines are not available at a site for transport of gas from a site or sites.

As an example, a method can include receiving data that include one or more of gas production chain data, gas supply chain data, and gas utilization data.

As an example, a method can include rendering a graphical user interface (GUI) to a display that includes an indicator for at least one identified unlit flare. In such an example, the GUI can provide for interactions with a computing system such that upon selection of an indicator for a site further information regarding the site can be accessed. In such an example, consider a control panel being rendered for display of control of equipment at the site, which may provide for control of flaring at the site.

As an example, a method can include receiving data that includes data indicative of smoke generated by one or more gas flaring operations. As explained, weather data acquired by a weather satellite may include information as to smoke, which may be visible as a plume from a site.

As an example, a method can include forming a composite image using a series of images of a region of interest; and utilizing the composite image in training a machine learning model to generate a trained machine learning model with increased sensitivity for flare identification in the region of interest. Such an approach can include using images from the same satellite or from different satellites. In such an example, a pattern may be discerned where flares and/or sites may be detected as objects that form the pattern. In such an example, each of the objects within the pattern may be further classified, for example, as corresponding to a lit flare, an unlit flare or one or more other types of objects (e.g., rigs, pipelines, facilities, roads, etc.).

As an example, a system can include a processor; a memory accessible by the processor; and processor-executable instructions stored in the memory that are executable to instruct the system to: receive data that comprise satellite data of a region of interest that includes multiple hydrocarbon production sites that include gas flaring equipment; identify one or more unlit gas flares at one or more of the multiple hydrocarbon production sites using a trained machine learning model and at least a portion of the data, where the trained machine learning model is trained using at least spatial and temporal satellite data to classify gas flares in the region of interest; and, based at least in part on identification of the one or more unlit gas flares, issuing at least one instruction related to operation of the gas flaring equipment in the region of interest.

As an example, one or more non-transitory computer-readable storage media can include computer-executable instructions executable to instruct a computer to: receive data that include satellite data of a region of interest that includes multiple hydrocarbon production sites that include gas flaring equipment; identify one or more unlit gas flares at one or more of the multiple hydrocarbon production sites using a trained machine learning model and at least a portion of the data, wherein the trained machine learning model is trained using at least spatial and temporal satellite data to classify gas flares in the region of interest; and, based at least in part on identification of the one or more unlit gas flares, issuing at least one instruction related to operation of the gas flaring equipment in the region of interest.

As an example, a method includes receiving data that include satellite data of a region that includes multiple sites; training a machine learning model using the data to generate a trained machine learning model; receiving additional data; and identifying one or more unlit flares at one or more of the multiple sites using the trained machine learning model and at least a portion of the additional data. In such an example, the machine learning model can include a convolution neural network.

As an example, a region can include a land region, an offshore region or a land region and an offshore region. As an example, data can include data from a plurality of different satellites. As an example, data can include weather data. As an example, data can include night time data and/or day time data.

As an example, a method can include, based at least in part on identifying an unlit flare (e.g., burner), estimating methane emissions at one or more of multiple sites.

As an example, a method can include determining a reason for an unlit flare being unlit.

As an example, a method can include supervised and/or unsupervised training of one or more machine learning models.

As an example, data can include transportation data. For example, consider transportation data for gas (e.g., LNG), oil, water, etc. As to water, it may indicate a hydraulic fracturing operation. As an example, once a pump truck departs a site, it may indicate that fracturing is completed. In such an example, gas production may increase, which may be expected to result in increased flaring if gas is not captured at the site. As an example, data can include gas production chain data, gas supply chain data, and/or gas utilization data. As to gas utilization, consider data as to one or more electrical power generation facilities that can include turbines or other technology to combust gas for electrical power generation.

As an example, a method can include, based at least in part on identifying an unlit flare, issuing a control instruction to control site equipment. For example, consider a control signal to light a flare to burn methane.

As an example, a method can include rendering a graphical user interface to a display that includes an indicator for at least one identified unlit flare.

As an example, a method can include running a simulation that simulates production of hydrocarbons based at least in part on identifying an unlit flare. In such an example, consider one or more simulations related to one or more types of gas (e.g., CO2, methane, etc.). As mentioned, a site may utilize artificial lift technology such as gas lift. As an example, a method may determine that gas lift is suitable and/or may identify when gas lift starts and/or stops (e.g., consider gas being directed from lift to flare for burning).

As an example, data can include data indicative of smoke generated by one or more flaring operations. For example, one or more types of sensors may provide indications of smoke, which may be an indicator of a poor quality burn (poor quality combustion). In such an example, a method can include issuing one or more signals such as a control signal to adjust combustion at a site (e.g., to improve burn quality).

As an example, data can include temporal data, which may be temporal images captured while a satellite and/or the Earth moves. As an example, a method can include analyzing temporal data, for example, as a series of images covering a location of one of multiple sites where the series of images are analyzed to identify a flare at the one of the multiple sites, where the analyzing using the series of images can increases sensitivity of flare identification. For example, a flare, particularly a smaller sized flare, may be relatively undetectable in a single image. However, where images cover a particular area (e.g., overlapping images, images from multiple days, etc.), the images may be analyzed together to improve detection of a flare. As an example, a method can include forming a composite image using the series of images and utilizing the composite image in training a machine learning model. In such an example, the composite image may be considered to be a type of enhanced image. As an example, where a location of a site is known, a method can include a detection routine that acts to utilize multiple images to improve flare detection at the site. For example, if a flare is not detected at the site using a single image, then the detection routine may call for analysis using multiple images, which, as mentioned, may include generation of a composite image for purposes of training, flare detection and/or detection of an unlit flare. In such an example, a system may provide for detection of more flares and provide for more robust detection of unlit flares (e.g., using one or more images, etc.).

As an example, a system can include a processor; a memory accessible by the processor; and processor-executable instructions stored in the memory that are executable to instruct the system to: receive data that include satellite data of a region that includes multiple sites; train a machine learning model using the data to generate a trained machine learning model; receive additional data; and identify one or more unlit flares at one or more of the multiple sites using the trained machine learning model and at least a portion of the additional data.

As an example, one or more computer-readable storage media can include computer-executable instructions executable to instruct a computer to: receive data that include satellite data of a region that includes multiple sites; train a machine learning model using the data to generate a trained machine learning model; receive additional data; and identify one or more unlit flares at one or more of the multiple sites using the trained machine learning model and at least a portion of the additional data.

A computer-readable storage medium (or computer-readable storage media) is non-transitory, not a signal and not a carrier wave. Rather, a computer-readable storage medium is a physical device that can be considered to be circuitry or hardware.

FIG. 17 shows components of an example of a computing system 1700 and an example of a networked system 1710 with a network 1720. The system 1700 includes one or more processors 1702, memory and/or storage components 1704, one or more input and/or output devices 1706 and a bus 1708. In an example embodiment, instructions may be stored in one or more computer-readable media (e.g., memory/storage components 1704). Such instructions may be read by one or more processors (e.g., the processor(s) 1702) via a communication bus (e.g., the bus 1708), which may be wired or wireless. The one or more processors may execute such instructions to implement (wholly or in part) one or more attributes (e.g., as part of a method). A user may view output from and interact with a process via an I/O device (e.g., the device 1706). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1710. The network system 1710 includes components 1722-1, 1722-2, 1722-3, . . . 1722-N. For example, the components 1722-1 may include the processor(s) 1702 while the component(s) 1722-3 may include memory accessible by the processor(s) 1702. Further, the component(s) 1722-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

In varying circumstances, those with skill in the art may also practice the disclosed invention according to any one of the following embodiments.

In varying circumstances, those with skill in the art may also practice the disclosed invention according to the following embodiments.

In an embodiment, a method (1500) is provided comprising: receiving data that comprise satellite data of a region of interest that includes multiple hydrocarbon production sites that comprise gas flaring equipment (1510); identifying one or more unlit gas flares at one or more of the multiple hydrocarbon production sites using a trained machine learning model and at least a portion of the data, wherein the trained machine learning model is trained using at least spatial and temporal satellite data to classify gas flares in the region of interest (1520); and, based at least in part on the identifying, issuing at least one instruction related to operation of the gas flaring equipment in the region of interest (1530).

In a further embodiment, the foregoing method (1500) includes wherein the receiving includes receiving weather data for the region of interest and optionally further comprising processing at least a portion of the satellite data using the weather data for the region of interest.

In a further embodiment, the foregoing methods include wherein the processing includes filtering based on atmospheric conditions indicated by the weather data for the region of interest for reducing false identification of an unlit gas flare state at one or more of the multiple hydrocarbon production sites.

In a further embodiment, the foregoing methods include identifying a lit gas flare; and classifying the lit gas flare as an intermittent gas flare or a continuous gas flare using the trained machine learning model.

In a further embodiment, the foregoing methods include comparing the one or more unlit gas flares to historic data for the one or more unlit gas flares to determine one or more occurrences of a change from a lit state to an unlit state.

In a further embodiment, the foregoing methods include wherein the trained machine learning model comprises a convolution neural network.

In a further embodiment, the foregoing methods include wherein the identifying one or more unlit gas flares comprises utilizing location data of previously lit flares.

In a further embodiment, the foregoing methods include, based at least in part on the identifying, estimating methane emissions at the one or more of the multiple hydrocarbon production sites.

In a further embodiment, the foregoing methods include wherein the data comprise night time data and day time data.

In a further embodiment, the foregoing methods include determining a reason for an unlit flare being unlit at one of the multiple hydrocarbon production sites.

In a further embodiment, the foregoing methods include wherein the data comprise transportation data and detecting a change in gas transportation.

In a further embodiment, the foregoing methods include wherein the data comprise one or more of gas production chain data, gas supply chain data, and gas utilization data.

In a further embodiment, the foregoing methods include rendering a graphical user interface to a display that comprises an indicator for at least one of the identified one or more unlit flares.

In an embodiment, a system (1590) is provided, comprising a processor (1593); a memory (1594) accessible by the processor; and processor-executable instructions (1596) stored in the memory that are executable to instruct the system to perform the method 1500 or any of the methods described in the foregoing further embodiments.

In an embodiment, a computer program product is provided that comprises computer-executable instructions to instruct a computing system to perform the method 1500 of any of the methods described in the foregoing further embodiments.

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
receiving data that comprise satellite data of a region of interest that includes multiple hydrocarbon production sites that comprise gas flaring equipment, wherein the data includes weather data for the region of interest;
processing at least a portion of the satellite data using the weather data for the region of interest, wherein the processing includes filtering based on atmospheric conditions indicated by the weather data for the region of interest for reducing false identification of an unlit gas flare state at one or more of the multiple hydrocarbon production sites;
identifying one or more unlit gas flares at the one or more of the multiple hydrocarbon production sites using a trained machine learning model and at least a portion of the data, wherein the trained machine learning model is trained using at least spatial and temporal satellite data to classify gas flares in the region of interest; and
based at least in part on the identifying, issuing at least one instruction related to operation of the gas flaring equipment in the region of interest.

2. The method of claim 1, further comprising:
identifying a lit gas flare; and
classifying the lit gas flare as an intermittent gas flare or a continuous gas flare using the trained machine learning model.

3. The method of claim 1, further comprising comparing the one or more unlit gas flares to historic data for the one or more unlit gas flares to determine one or more occurrences of a change from a lit state to an unlit state.

4. The method of claim 1, wherein the receiving, the identifying, and the issuing are performed automatically without manual intervention.

5. The method of claim 1, wherein the trained machine learning model comprises a convolutional neural network.

6. The method of claim 1, wherein the identifying one or more unlit gas flares comprises utilizing location data of previously lit flares.

7. The method of claim 1, wherein the data comprise data from a plurality of different satellites.

8. The method of claim 1, further comprising, based at least in part on the identifying, estimating methane emissions at the one or more of the multiple hydrocarbon production sites.

9. The method of claim 1, wherein the data comprise night time data and day time data.

10. The method of claim 1, further comprising determining a reason for an unlit flare being unlit at one of the multiple hydrocarbon production sites.

11. The method of claim 1, wherein the data comprise transportation data and detecting a change in gas transportation.

12. The method of claim 1, wherein the data comprise one or more of gas production chain data, gas supply chain data, and gas utilization data.

13. The method of claim 1, further comprising rendering a graphical user interface to a display that comprises an indicator for at least one of the identified one or more unlit flares.

14. The method of claim 1, wherein the data comprise data indicative of smoke generated by one or more gas flaring operations.

15. The method of claim 1, further comprising:
forming a composite image using a series of images of the region of interest; and
utilizing the composite image in training a machine learning model to generate the trained machine learning model with increased sensitivity for flare identification in the region of interest.

16. A system comprising:
a processor;
a memory accessible by the processor; and
processor-executable instructions stored in the memory that are executable to instruct the system to:
receive data that comprise satellite data of a region of interest that includes multiple hydrocarbon production sites that comprise gas flaring equipment, wherein the data includes weather data for the region of interest;
process at least a portion of the satellite data using the weather data for the region of interest, wherein the processing includes filtering based on atmospheric conditions indicated by the weather data for the region of interest for reducing false identification of an unlit gas flare state at one or more of the multiple hydrocarbon production sites;
identify one or more unlit gas flares at the one or more of the multiple hydrocarbon production sites using a trained machine learning model and at least a portion of the data, wherein the trained machine learning model is trained using at least spatial and temporal satellite data to classify gas flares in the region of interest; and
based at least in part on identification of the one or more unlit gas flares, issue at least one instruction related to operation of the gas flaring equipment in the region of interest.

17. One or more non-transitory computer-readable storage media comprising computer-executable instructions executable to instruct a computer to:
receive data that comprise satellite data of a region of interest that includes multiple hydrocarbon production sites that comprise gas flaring equipment, wherein the data includes weather data for the region of interest;
process at least a portion of the satellite data using the weather data for the region of interest, wherein the processing includes filtering based on atmospheric conditions indicated by the weather data for the region of interest for reducing false identification of an unlit gas flare state at one or more of the multiple hydrocarbon production sites;

identify one or more unlit gas flares at the one or more of
the multiple hydrocarbon production sites using a
trained machine learning model and at least a portion of
the data, wherein the trained machine learning model is
trained using at least spatial and temporal satellite data 5
to classify gas flares in the region of interest; and
based at least in part on identification of the one or more
unlit gas flares, issue at least one instruction related to
operation of the gas flaring equipment in the region of
interest. 10

\* \* \* \* \*

46